United States Patent
Herr

(10) Patent No.: US 7,298,516 B2
(45) Date of Patent: Nov. 20, 2007

(54) PREPARATION OF PRODUCTION DATA FOR A PRINT JOB USING A STILL IMAGE PROXY OF A PAGE DESCRIPTION LANGUAGE IMAGE FILE

(75) Inventor: Jeremy C. Herr, Jenkintown, PA (US)

(73) Assignee: ColorQuick.com, L.L.C., Pennsauken, NJ (US)

( * ) Notice: Subject to any disclaimer, the term of this patent is extended or adjusted under 35 U.S.C. 154(b) by 350 days.

(21) Appl. No.: 10/958,898

(22) Filed: Oct. 5, 2004

(65) Prior Publication Data

US 2005/0134901 A1 Jun. 23, 2005

Related U.S. Application Data

(62) Division of application No. 10/103,510, filed on Mar. 21, 2002, now Pat. No. 6,839,149.

(51) Int. Cl.
G06F 3/12 (2006.01)
G06K 15/00 (2006.01)

(52) U.S. Cl. .................... 358/1.15; 358/1.18; 358/1.13

(58) Field of Classification Search ............... 358/1.15, 358/1.14, 1.13, 1.18, 1.16, 1.17, 1.12, 1.11, 358/1.1, 1.2, 1.9, 1.3, 1.4, 1.5, 1.6, 1.7, 1.8, 358/540, 452, 406; 715/505, 507, 508, 527, 715/517, 523, 732, 744, 730, 788, 798, 800, 715/801; 345/472, 472.1, 472.2
See application file for complete search history.

(56) References Cited

U.S. PATENT DOCUMENTS 5,272,549 A 12/1993 McDonald (Continued)

FOREIGN PATENT DOCUMENTS

EP 0961451 A2 12/1999

(Continued)

OTHER PUBLICATIONS

"PDF for Prepress Workflow and Document Delivery," Adobe Systems Inc., San Jose, California, 1997, 8 pages.

(Continued)

Primary Examiner—Dov Popovici
(74) Attorney, Agent, or Firm—Akin Gump Strauss Hauer & Feld LLP

(57) ABSTRACT

A process is provided to prepare production data for a print job. The production data includes an electronic document defined by a page description language (PDL). The electronic document is stored in a PDL image file, such as a Postscript file, a PDF file, or the like. A still image proxy, which may be a JPEG file, a GIF file, a PNG file, or the like, is created of the PDL image file. An image display of the still image proxy is electronically manipulated. In addition, production specifications may be appended to the image display of the still image proxy. Information about the manipulations and production specifications are recorded and subsequently used to revise the PDL image file so as to match the PDL image file to the manipulations made to the image display of the still image proxy and to match the production specifications appended to the image display of the still image proxy. The production specifications may also include print job instructions that are used for preparation of the print job, but which do not physically alter the PDL image file.

12 Claims, 24 Drawing Sheets

(17 of 24 Drawing Sheet(s) Filed in Color)

U.S. PATENT DOCUMENTS

| | | | |
|---|---|---|---|
| 5,327,265 | A | 7/1994 | McDonald |
| 5,595,102 | A | 1/1997 | Rosen et al. |
| 5,748,484 | A | 5/1998 | Cannon et al. |
| 5,884,014 | A | 3/1999 | Huttenlocher et al. |
| 5,930,810 | A | 7/1999 | Farros et al. |
| 6,011,905 | A | 1/2000 | Huttenlocher et al. |
| 6,018,774 | A | 1/2000 | Mayle et al. |
| 6,026,433 | A | 2/2000 | D'Arlach et al. |
| 6,061,659 | A | 5/2000 | Murray |
| 6,065,057 | A | 5/2000 | Rosen et al. |
| 6,118,449 | A | 9/2000 | Rosen et al. |
| 6,123,362 | A | 9/2000 | Squilla et al. |
| 6,215,502 | B1 | 4/2001 | Ferguson |
| 6,223,190 | B1 | 4/2001 | Aihara et al. |
| 6,243,104 | B1 | 6/2001 | Murray |
| 6,266,684 | B1 | 7/2001 | Kraus et al. |
| 6,275,301 | B1 | 8/2001 | Bobrow et al. |
| 6,275,829 | B1 | 8/2001 | Angiulo et al. |
| 6,278,448 | B1 | 8/2001 | Brown et al. |
| 6,295,061 | B1 | 9/2001 | Park et al. |
| 6,310,601 | B1 | 10/2001 | Moore et al. |
| 6,330,542 | B1 * | 12/2001 | Sevcik et al. .................. 705/8 |
| 6,529,214 | B1 * | 3/2003 | Chase et al. ................ 715/744 |
| 7,024,046 | B2 | 4/2006 | Dekel et al. |

FOREIGN PATENT DOCUMENTS

| | | |
|---|---|---|
| WO | WO 00/70436 A1 | 11/2000 |

OTHER PUBLICATIONS

"Preparing Adobe® PDF files for high-resolution printing," Adobe Systems Inc., San Jose, California, 1998, 12 pages.

Adobe Postscript 3 Printing Glossary, Adobe Systems Inc., San Jose, California, 2001, 4 pages.

Evans, D. "Why Do We Offer Two Printing Technologies? How Do They Differ" (Adobe PostScript vs. Adobe PDF), Adobe Systems Inc., San Jose, California, 2002, 4 pages.

FAQ: What is a page-description language?, Citation Software Inc., printout from web site: http://www.citationsoftware.com/faqPDL.htm, printout date: Jan. 30, 2002, copyright 2000-2001, 3 pages.

Santa-Cruz, D. et al. "An analytical study of JPEG 2000 functionalities" (JPEG 2000 still image coding versus other standards), Proceedings of SPIE, vol. 4115 of the 45th annual SPIE meeting, Applications of Digital Image Processing XXIII, Jul. 2000, 11 pages.

McLean, N. et al. "Electronic Publishing: Technical Standards," printout from web site: http://www.adfa.edu.au/Epub/key/Technical.html, printout date: Oct. 24, 2001 (original publication date unknown), 31 pages.

What is the difference between JPEG, GIF and PNG?, Nov. 1998, printout from web site: http://www.ee.surrey.ac.uk/FAQ/standards.html, printout date: Mar. 6, 2002, 3 pages.

Printing Services order form, ReproGraphic Services, San Diego, California, 1999, 2 pages.

FAQ: How do I create a ps or pdf file of my paper?, Automatica On-Line Paper Review Management System PAMPUS, Jun. 2001, printout from web site: http://www.autsubmit.com/documents/pspdffaq.html, printout date: Oct. 24, 2001, 5 pages.

LaserGo GoScript Home Page, LaserGo, Inc., San Diego, California, printout from web site: http://www.lasergo.com, printout date: Jan. 31, 2002, 2 pages.

An Overview of Flash: Part 2, How is Flash Displayed to the User?, printout from web site: http://www.dartfrogmedia.com/overview/ovrvw02.htm, printout date: Oct. 24, 2001, 2 pages.

An Overview of Flash: Part 3, The Main Uses of Flash, printout from web site: http://www.dartfrogmedia.com/overview/ovrvw03.htm, printout date: Oct. 24, 2001, 3 pages.

TRIO ThinkQuest: Macromedia Flash 5 Tutorial: Part 2, printout from web site: http://depts.washington.edu/trio/comp/howto/pieces/flash/tutorial/flash2.shtml, printout date: Jan. 31, 2002 (last revised Dec. 2001), 4 pages.

Creating Generator Objects—Inserting GIF, JPEG and PNG files, printout from web sites: http://flashhelp.advances.net/flashhelp/usinggenerator/html/02objects5.html, printout date: Jan. 31, 2002, 2 pages.

"RealTimeProof™ Classic" Client User's Guide, Version 2.0, Copyright © 2000, RTimage Ltd., Or-Yehuda, Israel, 98 pages.

"RealTimeProof™ Classic" Marketing White Pages, Version 2.0, Copyright © 2000, RTimage Inc., 39 pages.

* cited by examiner

COMPUTER-READABLE MEDIUM computer-executable
instructions for performing
steps in Fig. 7 and
for implementing means
in Fig. 22

FIG. 23

PREPARATION OF PRODUCTION DATA FOR A PRINT JOB USING A STILL IMAGE PROXY OF A PAGE DESCRIPTION LANGUAGE IMAGE FILE

CROSS-REFERENCE TO RELATED APPLICATIONS

This application is a divisional of U.S. application Ser. No. 10/103,510 filed Mar. 21, 2002 now U.S. Pat. No. 6,839,149, the entire disclosure of which is incorporated herein by reference.

COMPACT DISC APPENDIX

This patent application includes an Appendix on one compact disc having a file named appendix.txt, created on Oct. 4, 2004, and having a size of 193,267 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The printing industry is rapidly adopting automated workflow processes, including processes that allow customers to electronically submit documents for inclusion into print publications or to be printed. The Internet has accelerated this process by allowing users to submit electronic documents to a printing company web site or a publisher's web site, via a browser.

Prepress refers to the production process before ink or toner goes on the paper. Electronic prepress refers to production methods involving desktop publishing, scanning of artwork or photos, film output or plate output from an imagesetter, or direct to print production. Automated workflow processes use electronic prepress. Preflight is an operation in electronic prepress wherein a supplied electronic file is evaluated to determine if all of the elements necessary to print from it are included and useable. In an automated workflow process, preflight is performed by a computer program that evaluates the file and advises of possible problems in a preflight report.

In one conventional (prior art) preflight process performed by ColorQuick.com, L.L.C., Pennsauken, N.J., the preflight report indicates if the page size of the submitted document does not match the allocated space for the printed version of the document. For example, if a customer submits an electronic file of an advertisement that has a page size of 7 in×10 in, but the customer's publication advertisement size (i.e., the advertisement space that the customer has purchased) is 6.5 in×9.5 in, then the preflight report indicates that the file must be corrected and sent in again. Manual intervention is now required to address the problem. The publisher must inform the customer of the size problem and the customer must rework the advertisement. The reworked advertisement must be resubmitted and rerun through the preflight process. If the customer is not careful in resizing the advertisement, the reworked advertisement could be rejected as well.

The electronic document printing process used by commercial printers and service providers is rapidly moving towards using documents that are defined by a page description language, such as Adobe® PostScript® defined by .ps files, PDF (Portable Document Format, also from Adobe) defined by .pdf files, and PCL (Printer Control Language, an Hewlett-Packard format) defined by .pcl files. A page description language (PDL) is a computer language that defines how elements such as text and graphics appear on the printed page (i.e., the layout and contents of a printed page). PostScript is the industry-standard PDL. Detailed explanations of the Adobe PDL's and how they are used in a printing environment are provided in the following publications:

"PDF for Prepress Workflow and Document Delivery," Adobe Systems Inc., San Jose, Calif., 1997, 8 pages.

"Preparing Adobe® PDF files for high-resolution printing," Adobe Systems Inc., San Jose, Calif., 1998, 12 pages.

Many programming tools for image processing of PDL-defined images are complex and expensive. Special programs, such as Adobe Acrobat®, must be used to manipulate PDL-defined images. To promote proprietary formats, companies such as Adobe distribute free software that allows users to read the image files, but require a paid license for versions of the software that allow for manipulating the image files. Even if parties at both ends of a workflow process (e.g., a commercial printer and a customer) have access to read and edit versions of such software, the two parties can only view and edit the files within the designated format using the proprietary software.

Furthermore, no convenient methods exist to visually and interactively append production specifications to PDL-defined images.

As the printing industry moves towards automating customer interactions, additional tools are needed so that customers can more easily interact with their printing jobs within an automated environment when changes must be made to their files. The present invention fulfills such a need.

BRIEF SUMMARY OF THE INVENTION

A process is provided to prepare production data for a print job. In one embodiment of the present invention, the production data includes an electronic document defined by a page description language (PDL). The electronic document is stored in a PDL image file, such as a Postscript file, a PDF file, or the like. A still image proxy, which may be a JPEG file, a GIF file, a PNG file, or the like, is created of the PDL image file. An image display of the still image proxy is electronically manipulated. In addition, production specifications may be appended to the image display of the still image proxy. Information about the manipulations and production specifications are recorded and subsequently used to revise the PDL image file so as to match the PDL image file to the manipulations and production specifications made to the image display of the still image proxy. The production specifications may also include print job instructions that are used for preparation of the print job, but which do not physically alter the PDL image file.

BRIEF DESCRIPTION OF THE SEVERAL VIEWS OF THE DRAWINGS

The file of this patent contains at least one drawing executed in color. Copies of this patent with color drawings will be provided by the Patent and Trademark Office upon request and payment of the necessary fee.

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 shows a display screen for creating an advertisement specification for ad space in a publication in accordance with one embodiment of the present invention;

Figure 2A:
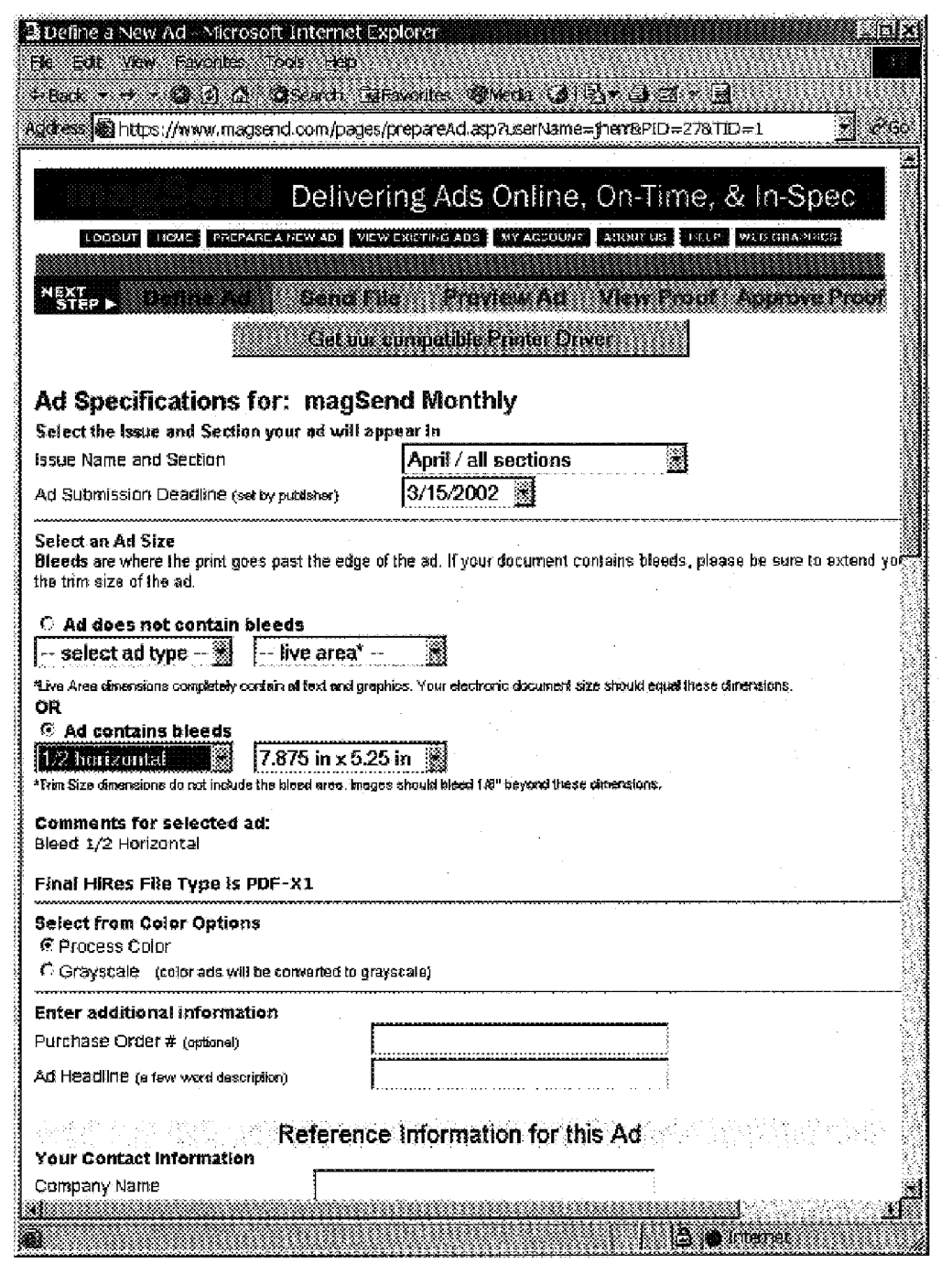
Figure 2B:
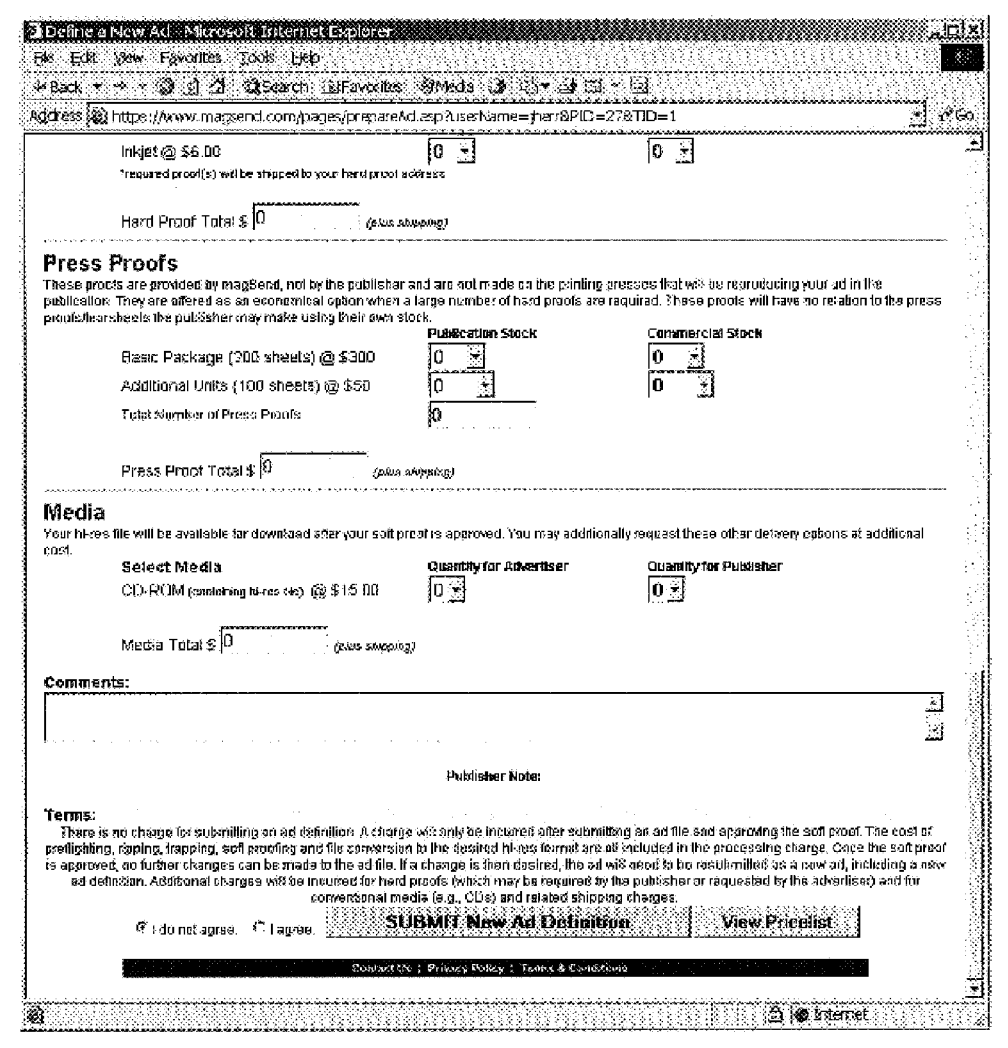
Figure 3:
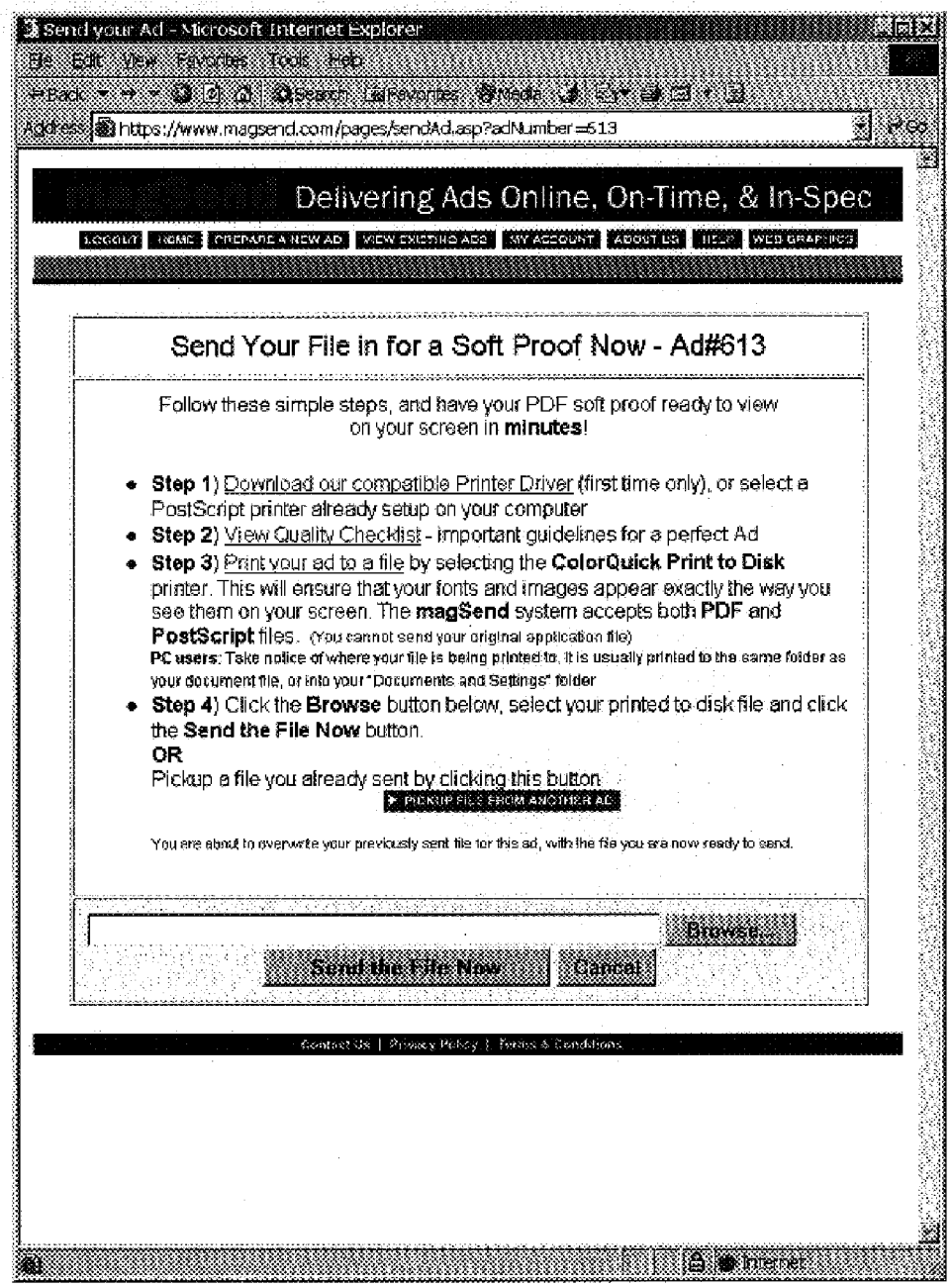
Figure 4:
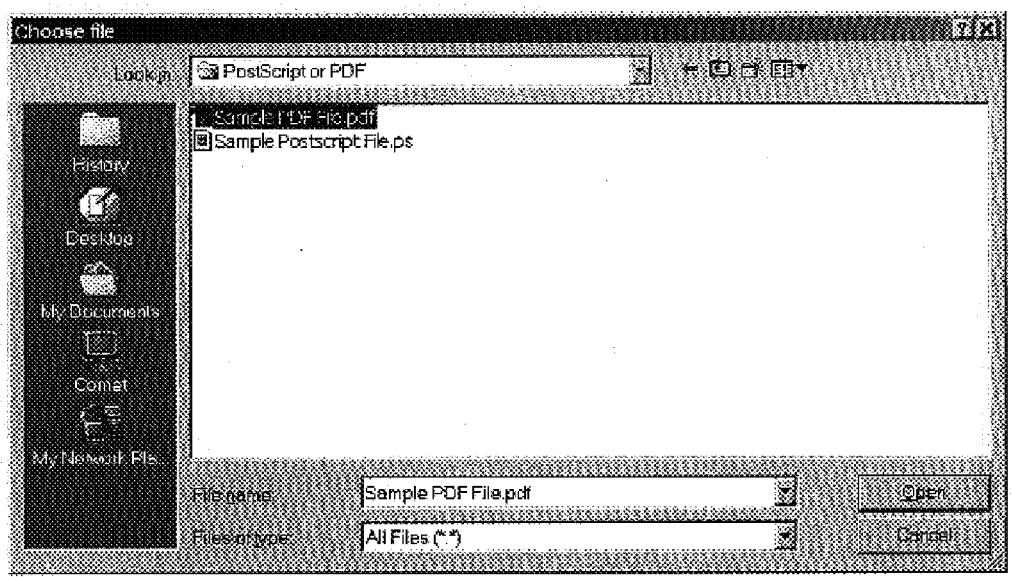
Figure 5:
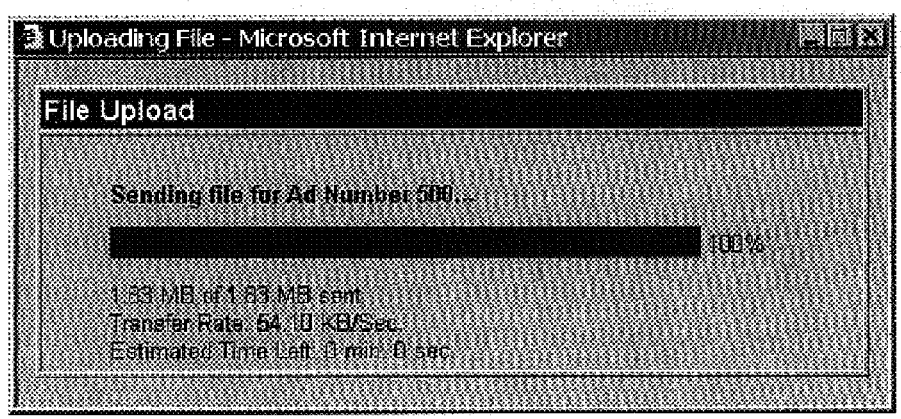
Figure 6:
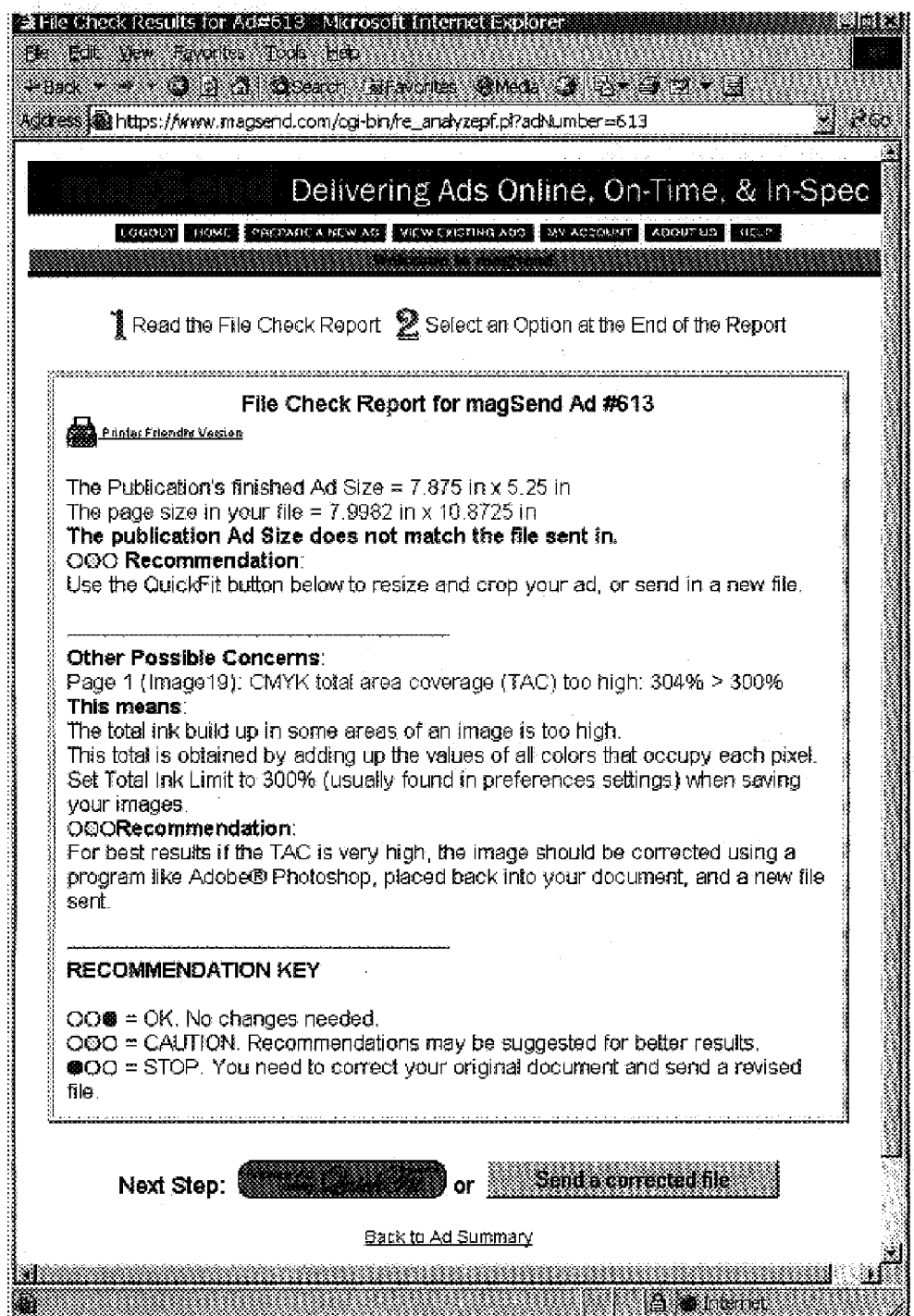
Figure 7:
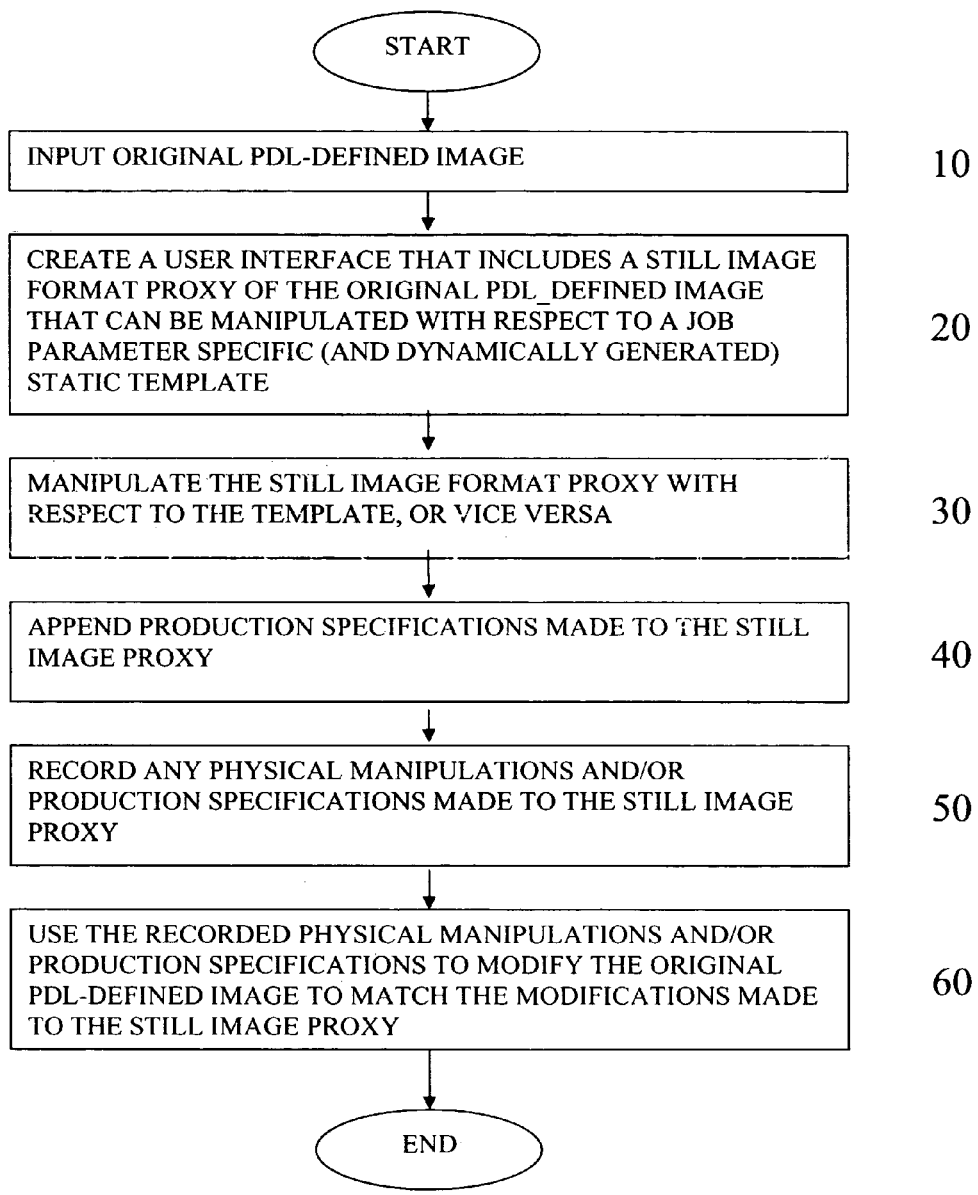
Figure 12:
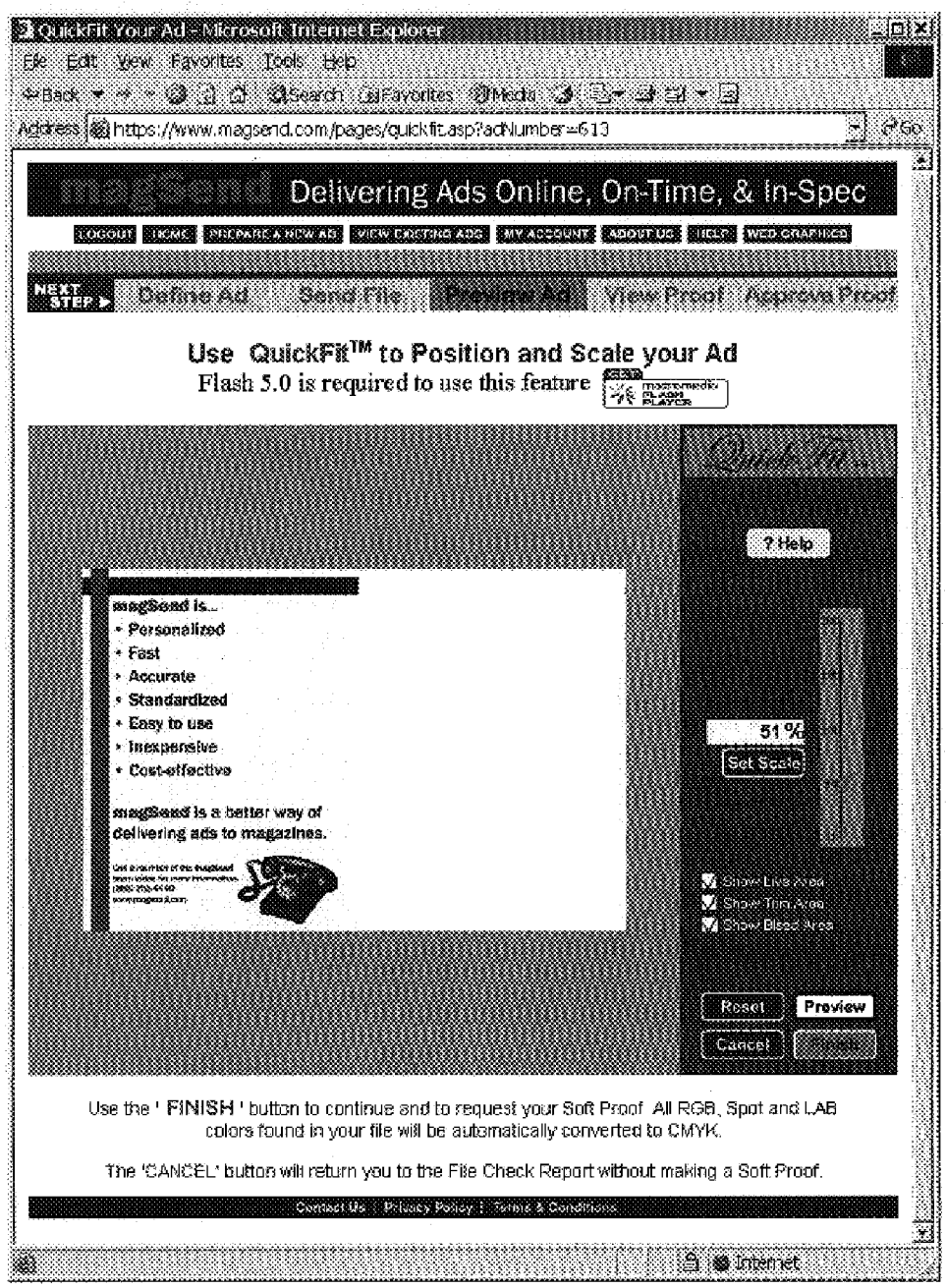
Figure 13:
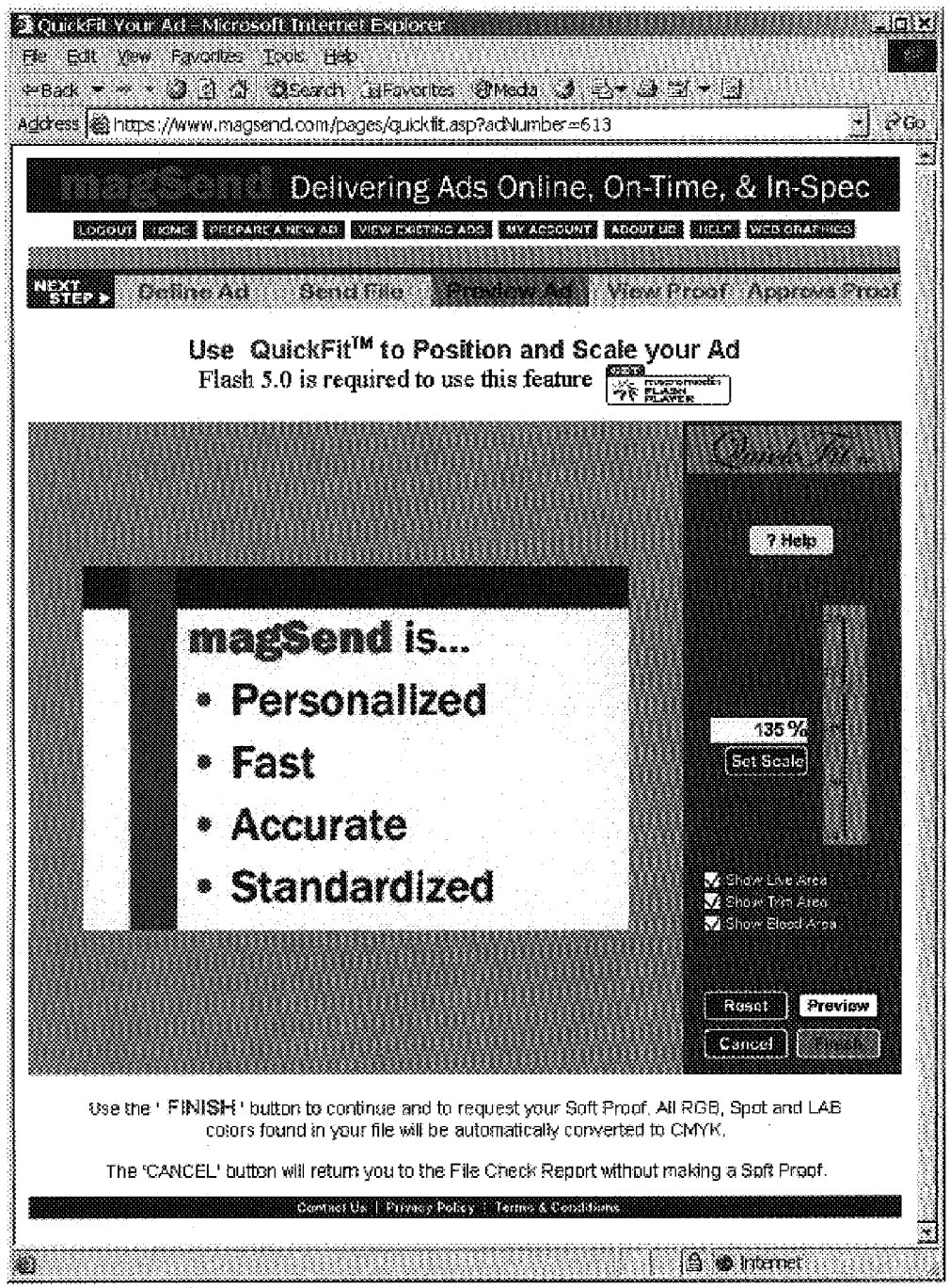
Figure 14:
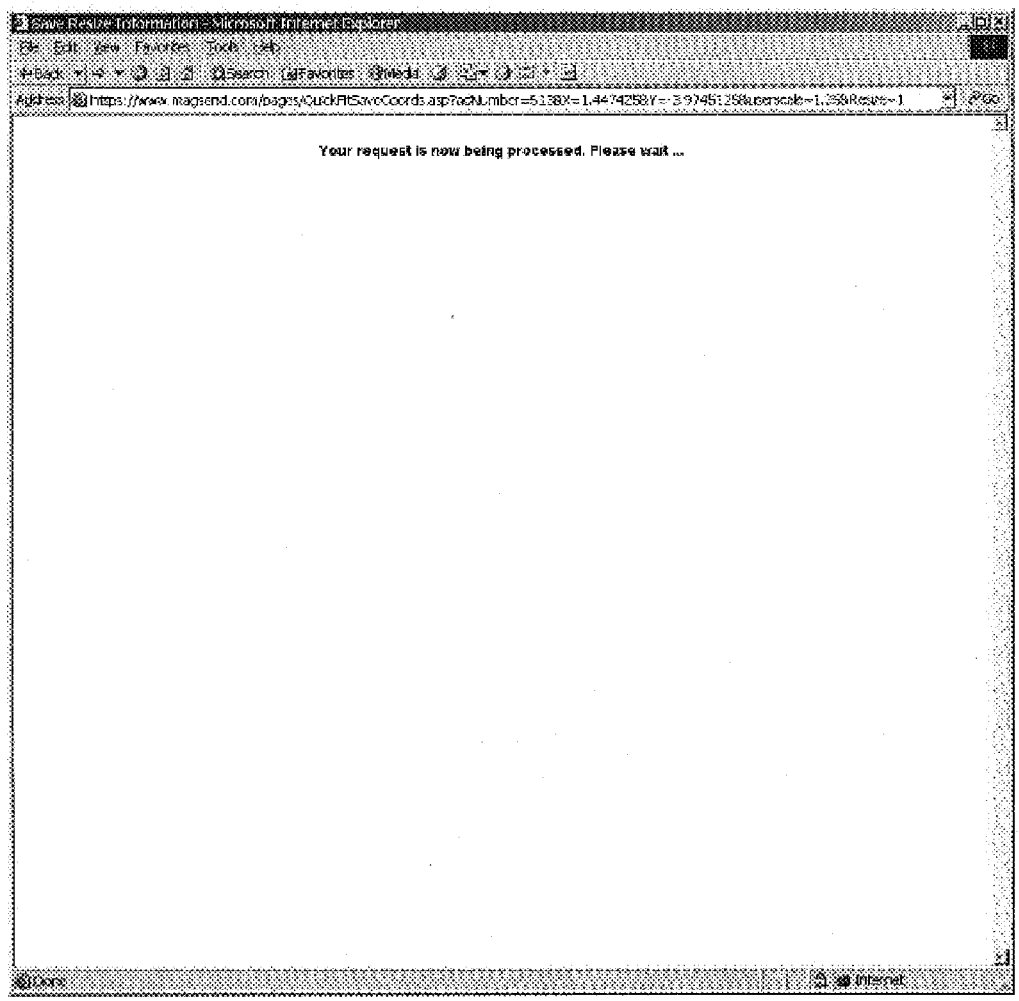
Figure 15:
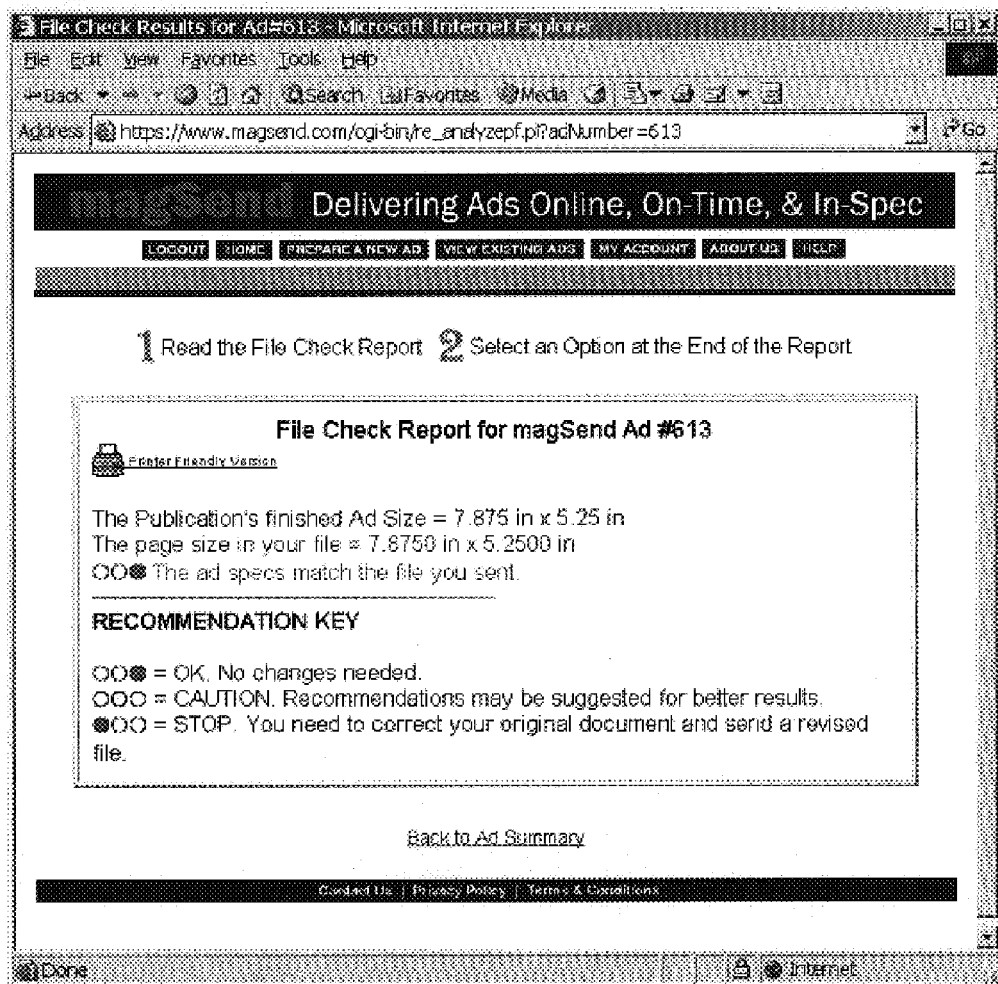
Figure 16:
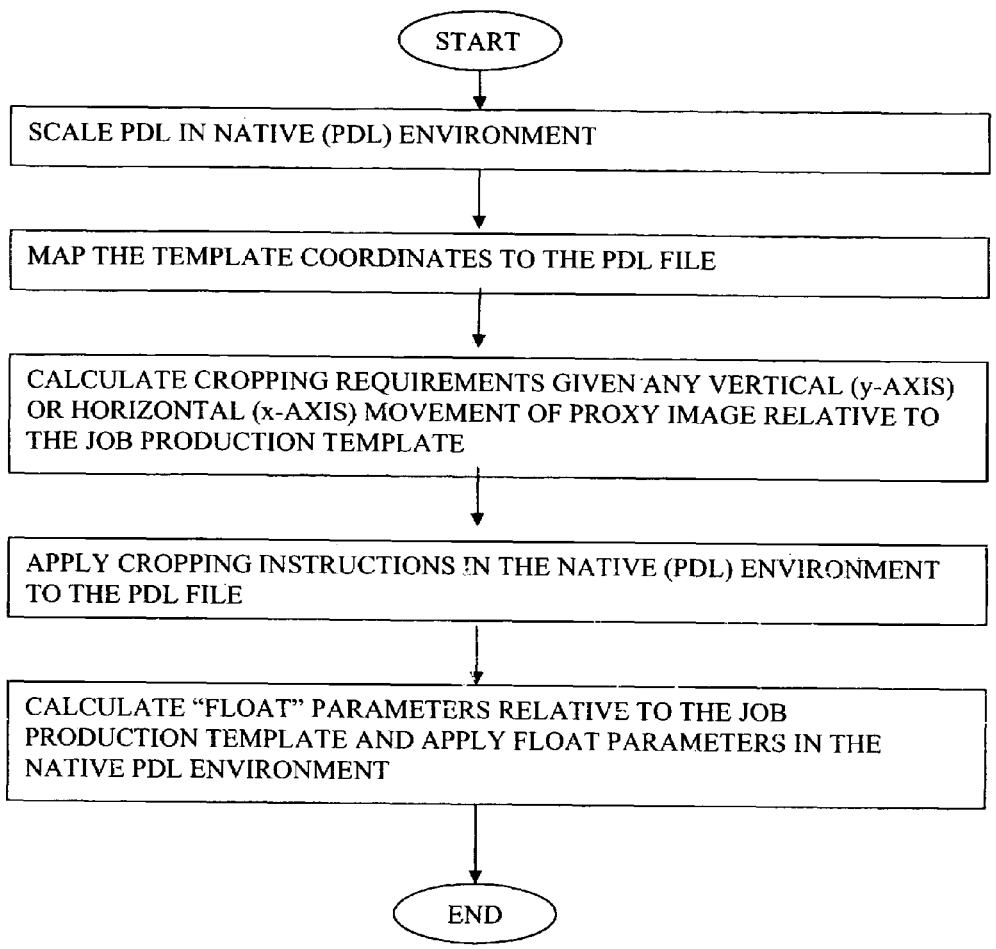
Figure 18:
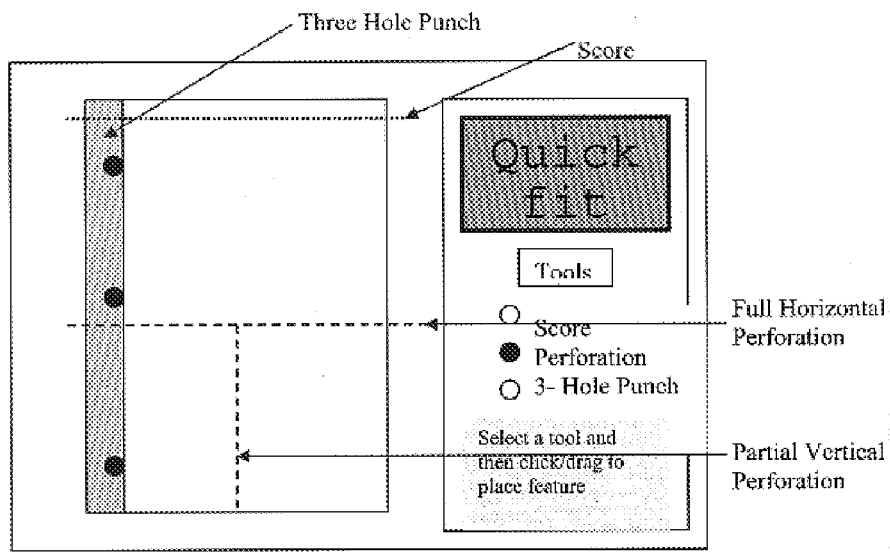
Figure 19:
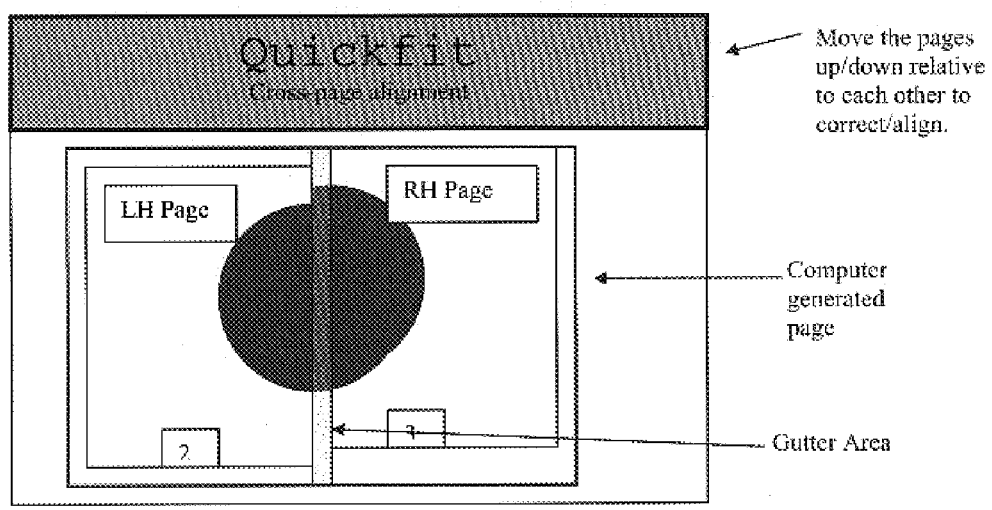
Figure 20:
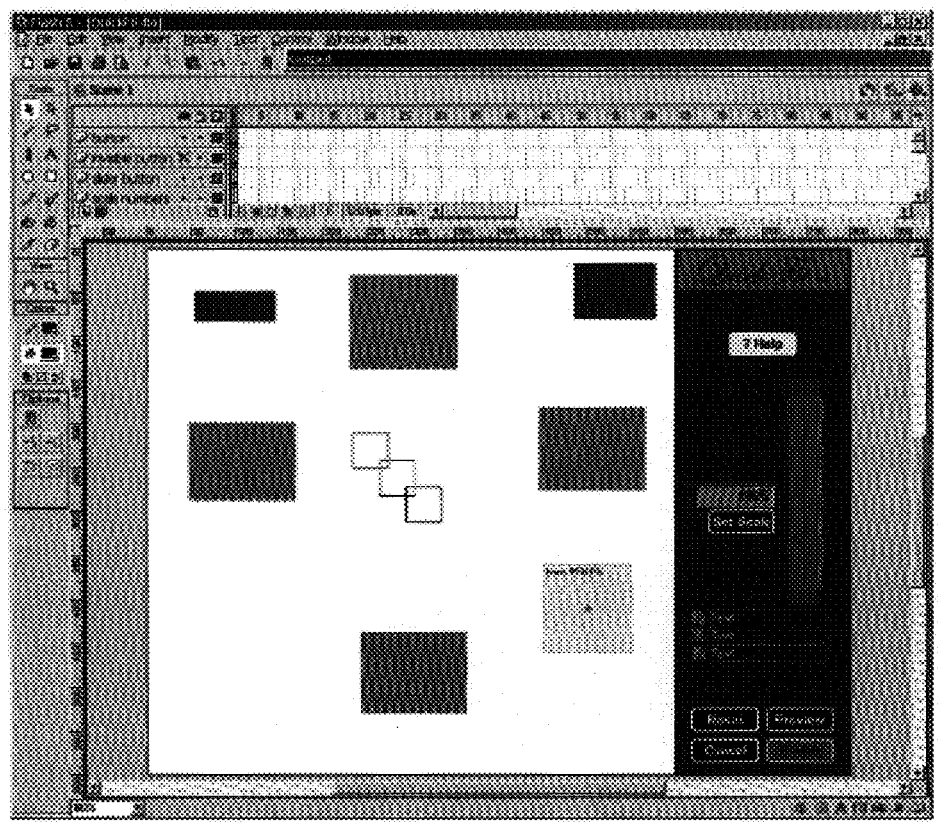
Figure 21:
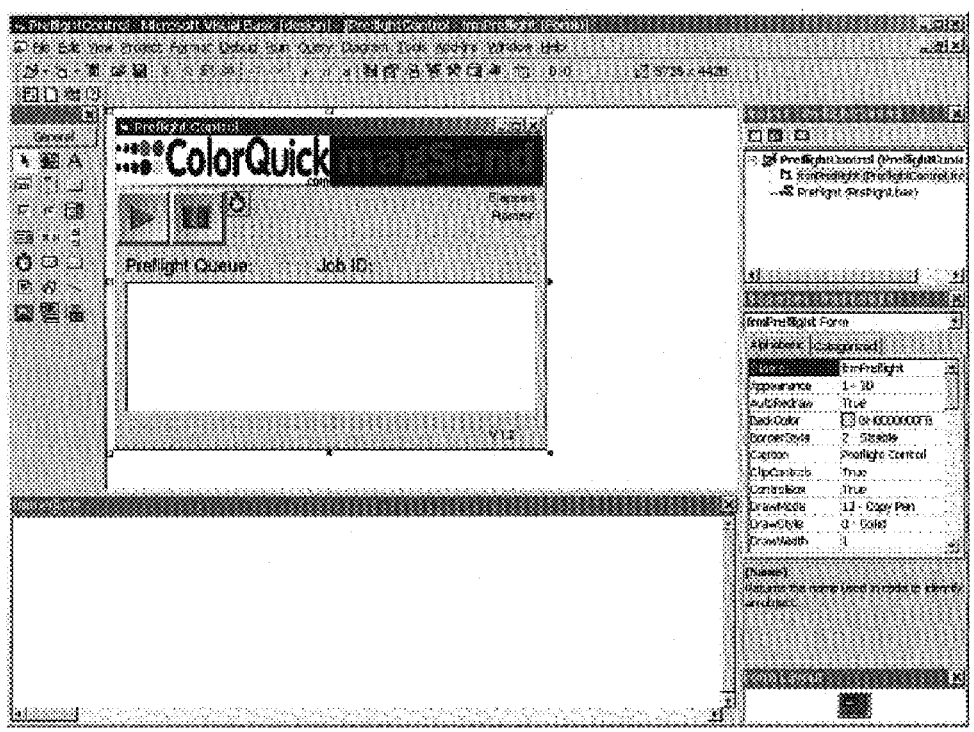

FIGS. 2A and 2B, taken together, show a display screen for allowing a user to enter an ad definition for an ad that is desired to appear in a publication in accordance with one embodiment of the present invention;

FIG. 3 shows a display screen for submitting an electronic file of a specific ad;

FIG. 4 shows a display screen for selecting an electronic file to send over an electronic network to a service bureau;

FIG. 5 shows a display screen of a progress bar that appears during the file transfer of FIG. 4;

FIG. 6 shows a preflight report in accordance with one preferred embodiment of the present invention;

FIG. 7 is a flowchart of the steps associated with one preferred embodiment of the present invention;

FIGS. 8-13 show display screens of a user interface presented at a browser for allowing an electronic file to be manipulated with respect to a template in accordance with one embodiment of the present invention;

FIG. 14 shows coordinates and the scale percentage resulting from user manipulations performed via the user interface of FIGS. 8-13 being transmitted over an electronic network to a remote server;

FIG. 15 shows a follow-up preflight report;

FIG. 16 is a partial flowchart of the steps associated with preflight control PDL manipulations in accordance with one preferred embodiment of the present invention;

FIGS. 17A-17D illustrate a process for dynamically generating templates in accordance with one preferred embodiment of the present invention;

FIG. 18 shows examples of appending production specifications to still image proxies of PDL images;

FIG. 19 shows manipulation of two pages of still image proxies of PDL images relative to each other;

FIG. 20 is a design view associated with a Flash Movie embodiment of the present invention for manipulating the still image proxy; and FIG. 21 is a design view of a preflight control status window related to PDL manipulations during preflight control.

Figure 22:
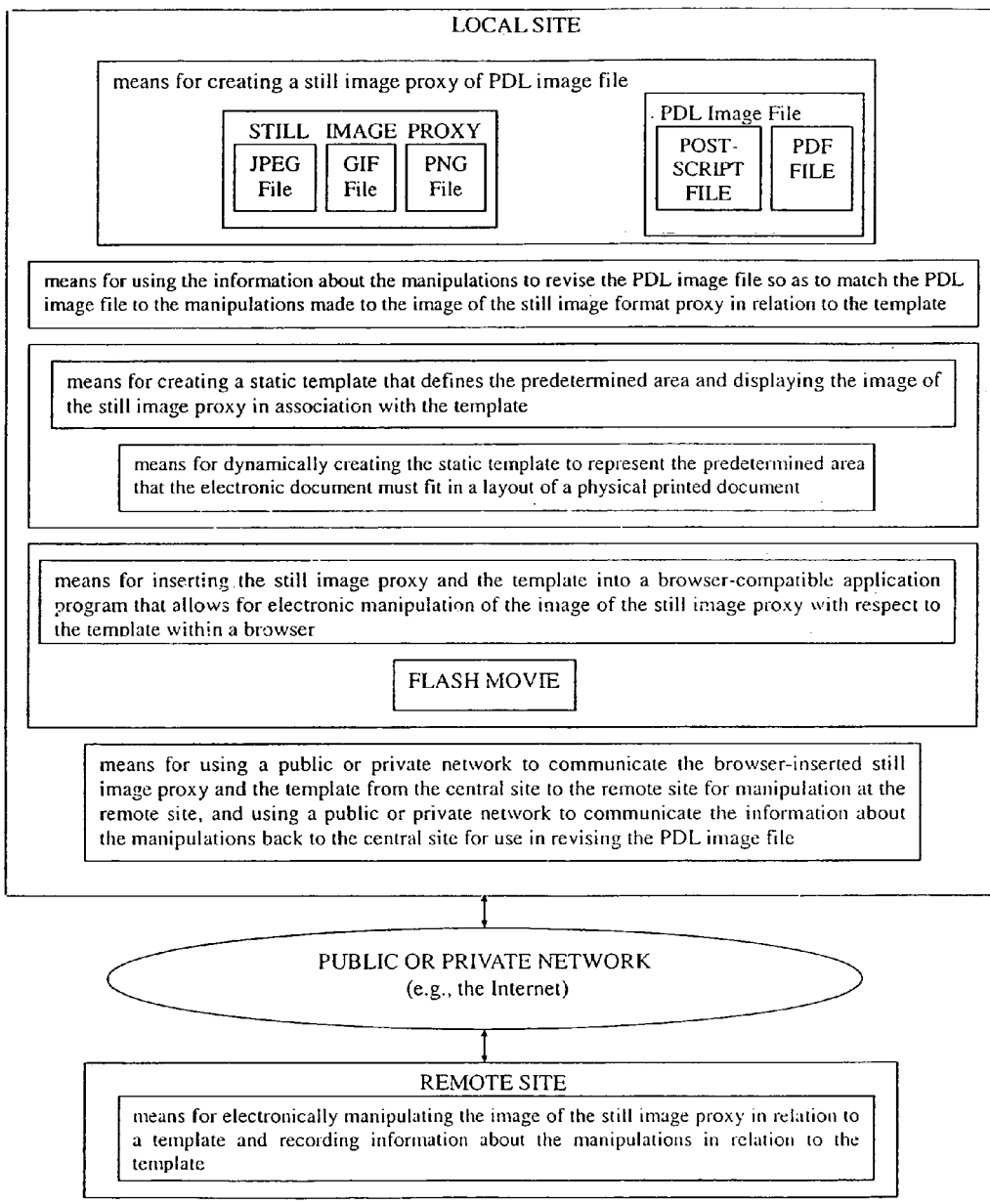

FIGS. 22 and 23 show the means and article of manufacture for implementing the present invention.

DETAILED DESCRIPTION OF THE INVENTION

I. Overview of Present Invention

A first embodiment of the present invention provides an automated computer-implemented process for preparing production data for a print job. The production data includes an electronic document defined by a page description language (PDL). The electronic document is stored in a PDL image file, such as a Postscript file, a PDF file, or the like. In the process, a still image proxy is created of the PDL image file. An image display of the still image proxy is electronically manipulated. Information about the manipulations are recorded and subsequently used to revise the PDL image file so as to match the PDL image file to the manipulations made to the image display of the still image proxy. The still image proxy may be a JPEG file, a GIF file, a PNG file, or the like.

In one example of the first embodiment, the production data comprises a predetermined area in which the electronic document must fit. A static template is dynamically created that defines the predetermined area and the image display of the still image proxy is then displayed in association with the template. In this embodiment, the image display of the still image proxy is electronically manipulated in relation to the template and information about the manipulations is recorded in relation to the template. Furthermore, information about the manipulations is used to revise the PDL image file so as to match the PDL image file to the manipulations made to the image display of the still image proxy in relation to the template. The template may represent the predetermined area that the electronic document must fit in a layout of a physical printed document. The electronic document may be an advertisement and the template may be the area of purchased advertisement space. The manipulations may include a change in scaling percentage or alignment changes of the image display of the still image proxy in relation to the template.

The image display of the still image proxy may be inserted into a browser-compatible application program such as a Flash movie that allows for electronic manipulation of the image display of the still image proxy within a browser. All of the steps above may occur at a central site, except for the manipulation of the image display of the still image proxy which occurs at a remote site. A public network (such as the Internet), or a private network may be used to communicate the browser-inserted still image proxy from the central site to the remote site for manipulation at the remote site. The public or private network may then be used to communicate the information about the manipulations back to the central site for use in revising the PDL image file.

A second embodiment of the present invention provides a process for preparing production data for a print job. The production data includes an electronic document defined by a page description language (PDL). The electronic document is stored in a PDL image file. In the process, a still image proxy is created of the PDL image file. Production specifications are electronically appended to the image display of the still image proxy and information about the production specifications are recorded. The recorded information is then used to prepare production data for the print job.

In one example of the second embodiment, the production specifications are physical manipulations of stock used in the print job. The physical manipulations of the print job are appended to the image display of the still image proxy in the desired relation to the image display of the still image proxy. Information about the physical manipulations are recorded and subsequently used to prepare production data for the print job. One example of physical manipulations of stock include bindery specifications.

A third embodiment of the present invention provides an automated computer-implemented process for viewing production data for a print job. The production data includes an electronic document defined by a page description language (PDL) and a predetermined area in which the electronic document must fit. The electronic document is stored in a PDL image file and has predefined physical dimensions. In the process, a still image proxy of the PDL image file is created. Also, a static template is created that defines the predetermined area. The physical dimensions of the template are dynamically determined based on the area in which the electronic document must fit. The physical dimensions of the image display of the still image proxy are dynamically determined based on the relative size of the predefined physical dimensions of the PDL image file to the predetermined area in which the electronic document must fit. An image display of the still image proxy is displayed in association with the template and is then electronically manipulated. Information about the manipulations are recorded and subsequently used to revise the PDL image file so as to match the PDL image file to the manipulations made to the image display of the still image proxy. The still image proxy and the template may be inserted into a browser-compatible application program that allows for electronic manipulation of the image display of the still image proxy in relation to the template within a browser. The template is sized so as to appear as large as possible within the application program, regardless of the actual predetermined area in which the electronic document must fit. This provides for maximum viewability of the template and the image display of the still image proxy within the browser.

In one example of the third embodiment, the template represents the predetermined area that the electronic document must fit in a layout of a physical printed document. The electronic document may be an advertisement and the template is the area of purchased advertisement space.

II. Detailed Disclosure

FIGS. 1-21 illustrate one preferred embodiment of the present invention described in the context of an enhancement to a web-based software application being commercialized as magSend™ (www.magsend.com), which is a complete solution for digital ad workflow to publishers. magSend is a service of ColorQuick.com, L.L.C., Pennsauken, N.J. In this example, customers submit ads to magSend which acts as a service bureau for the electronic prepress for magazines. However, the scope of the present invention is not limited to this particular implementation of the invention. The present invention is described in the context of a plurality of distributed computers, all of which are linked together by an electronic network, such as the Internet. The computers may be any type of computing device that allows a user to interact with a web site via a web browser. For example, the computers may be personal computers (PC) that run a Microsoft Windows® operating system. The computers may also be handheld, wireless devices.

Figure 1:
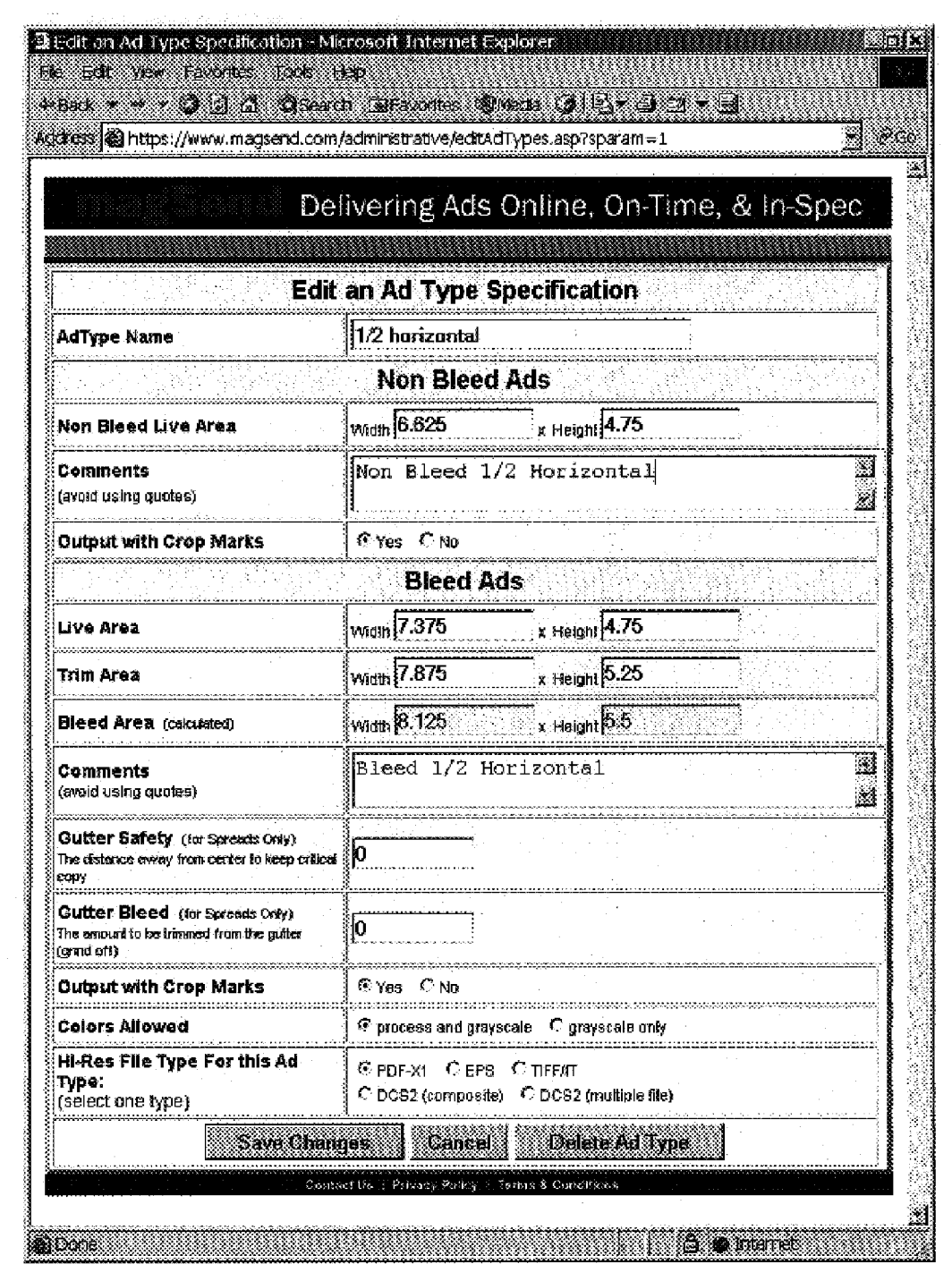

FIG. 1 shows a display screen for creating an advertisement (ad) specification for ad space in a publication. This step would typically be performed by an administrator of the service. The trim area of the specified ad is 7.875 in×5.25 in.

FIGS. 2A and 2B, taken together, show a display screen for allowing a user to enter an ad definition for an ad that is desired to appear in a publication.

FIG. 3 shows a display screen for submitting an electronic file of a specific ad, here, ad #613, in a PDL file format.

FIG. 4 shows a display screen for selecting the PDL file to send over the electronic network to the service bureau.

FIG. 5 shows a display screen of a progress bar that appears during the file transfer.

FIG. 6 shows a preflight report for ad #613. The preflight report indicates that the page size of the document in the submitted file, 7.9982 in×10.8725 in does not match the allocated space for the printed version of the document (i.e., the advertisement space that the customer has purchased) which is 7.875 in×5.25 in. The customer is prompted with two options. One option is similar to the conventional ColorQuick preflight process described above which is to send a corrected file which requires manual intervention by the customer. Another option in accordance with the present invention is to select an automated process called QuickFit™. A QuickFit icon is shown in FIG. 6. If the user selects QuickFit, no manual intervention is required to address the sizing problem. Instead, the customer manipulates the ad via a browser-based application, the manipulations are delivered back to the service bureau, and the service bureau uses automated software to revise the original image file based on the manipulations.

FIG. 7 is a flowchart of the steps associated with one preferred embodiment of the present invention. The first step in the process is that a customer provides an image defined by a PDL to a web server of a service bureau, here, magSend (step 10). In the illustrated example, the image is an advertisement-type document. The image file may be electronically uploaded to the service bureau or input via a transferable digital medium (e.g., a diskette). This step is conventional and thus is not described in further detail.

A user interface is then created by the service bureau for subsequent manipulation of the original PDL-defined image (step 20). More specifically, the PDL-defined image is converted into a still image proxy, such as a JPEG (.jpg) file, a GIF (.gif) file, or a PNG (.png) file, thereby creating a still image proxy representation of the original PDL image. In the present example, JPEG is used. This step is conventional and thus is not described in further detail. One suitable software program that converts Postscript files to bit-mapped formats such as JPEG is LEADTOOLS, available from LEAD Technologies, Inc., Charlotte, N.C. Other suitable conversion programs include GoScript®, available from LaserGo, Inc., San Diego, Calif.

The still image proxy (here, the JPEG image) is inserted into a browser-compatible program that allows a user to manipulate the JPEG image with respect to a dynamically generated, job parameter specific, static template (step 20). The inserted JPEG image effectively becomes a "proxy" for the original PDL image. In one preferred embodiment of the present invention, the JPEG image is inserted into a Flash® Movie. A Flash movie may created using Macromedia Flash 5, available from Macromedia, Inc., San Francisco, Calif. The general process for dynamically inserting a JPEG image into a Flash Movie is well-known. The resultant Flash Movie shows the dynamically generated static template having the still image proxy inserted therein, or superimposed thereon.

In the preferred embodiment of the present invention, the dimensions of the static template and the dimensions of the image display of the still image proxy are determined based upon the relative dimensions of the original PDL image file and the predetermined area in which the electronic document must fit (which is the purchased ad space in this example). Thus, although the template is fixed or static after creation, its actual dimensions are dynamically determined based on the area in which the electronic document must fit, and the physical dimensions of the image display of the still image proxy are dynamically determined based on the relative size of the predefined physical dimensions of the PDL image file to the predetermined area in which the electronic document must fit. The template is created at run time. One goal of this process is to maximize the viewing area.

FIGS. 8-13 show a user interface presented at a browser for allowing the user to manipulate the image display of the still image proxy with respect to the static template (step 30). This user interface was created via the Flash movie process described above. The user interface shows a template, the still image proxy, a scale modifier slider bar for enlargement/ reduction, selection buttons to show or hide borders of the live area, trim area and bleed area, and function buttons (Reset, Preview, Cancel, Finish). The template alternatively provides three different borders for the live area, trim area and bleed. Only the live area is shown for a non-bleed ad.

During the manipulation in step 30, no communication needs to occur with the web server that delivered the Flash Movie. However, the user's browser session remains active during the manipulations. The Flash Movie plug-in contains all of the necessary features to allow for the manipulations without needing to contact the web server. The still image proxy can be manipulated in any manner that the original PDL image file may manipulated. In the embodiment of the present invention shown in FIGS. 8-13, two different manipulations can be performed, namely enlargement/re- duction scaling of the entire image, and x-y coordinate transformations of the entire image with respect to the template. Any manipulations that can be performed on a PDF file can be performed on the still image proxy and the scope of the invention includes all such manipulations. Drag-and-drop mouse movements are used to reposition the still image proxy. The scale modifier slider bar is used to change the scale. The user makes such manipulations until the user is satisfied with the size and placement of the still image proxy with respect to the template borders. The manipulations are recorded by tracking the x and y coordi- nates for the center of the still image proxy relative to the center of the ad space, and the scale percentage relative to the original size of the still image proxy (step 50). Depend- ing upon the live area, trim area and bleed, the still image proxy may spill outside of these template borders. An important feature of the present invention is that this process allows the user to view exactly how the ad will appear within the purchased ad space, as well as to correct any obvious sizing or alignment errors. If the user cannot satisfactorily size and place the ad in the ad space, then the user imme- diately knows that the ad must be modified and knows exactly how the ad must be modified, all without needing to consult the publisher. Alternatively, the user may wish to reconsider the size of the purchased ad space.

Figure 8:
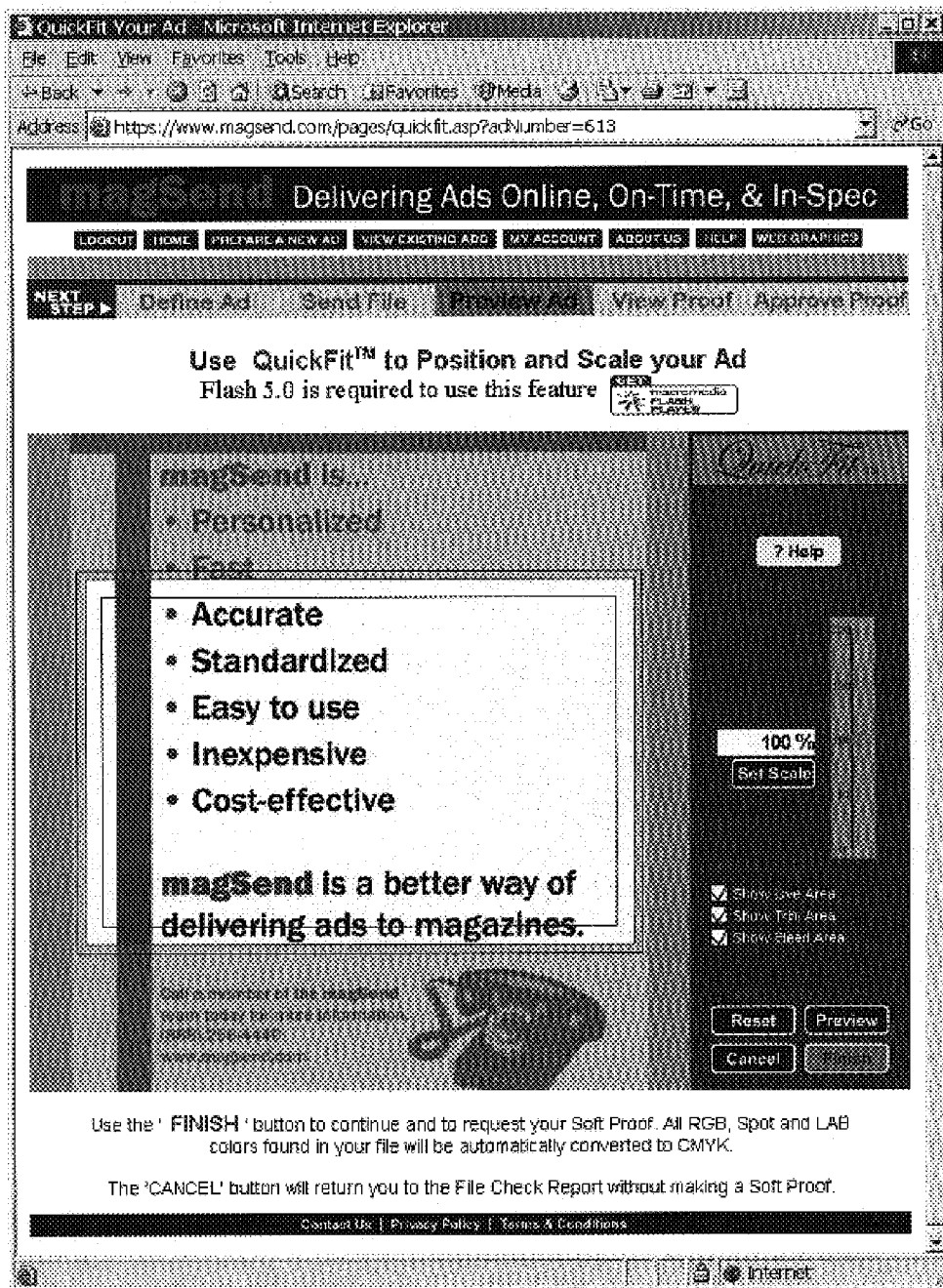

FIG. 8 shows the still image proxy as being relatively larger than the ad space. The relative size difference matches exactly the actual relative size difference between the actual page size of the document in the submitted file for ad #613 (7.9982 in×10.8725 in) and the advertisement space that the customer has purchased (7.875 in×5.25 in). In one alterna- tive embodiment of the present invention, the initial scale percentage is set so that the largest dimension of the ad fits exactly within the border of the ad space. In this example, the initial scale percentage would be about 51%, as shown in FIG. 11.

Figure 9:

FIG. 9 shows the scaling capability of the Quick Fit process wherein the still image proxy is scaled to 135% of its actual size relative to the actual size of the ad space.

Figure 10:
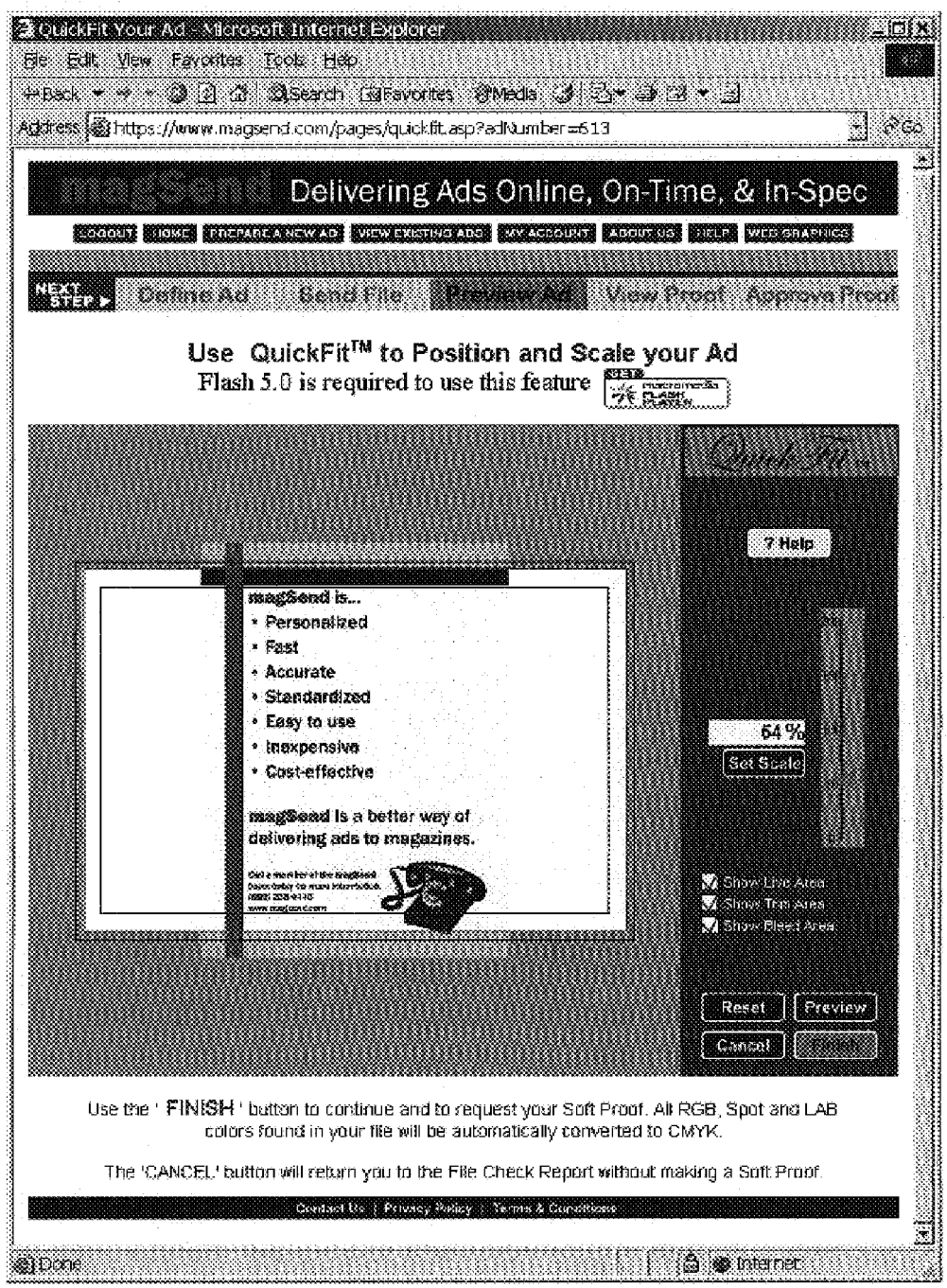

FIG. 10 also shows the scaling capability wherein the still image proxy is scaled to 54% of its actual size relative to the actual size of the ad space. The scale percentage in FIG. 10 was selected so that all text falls within the live area. To keep text within the publisher's recommended guidelines, the final scale percentage should not be greater than this value.

Figure 11:
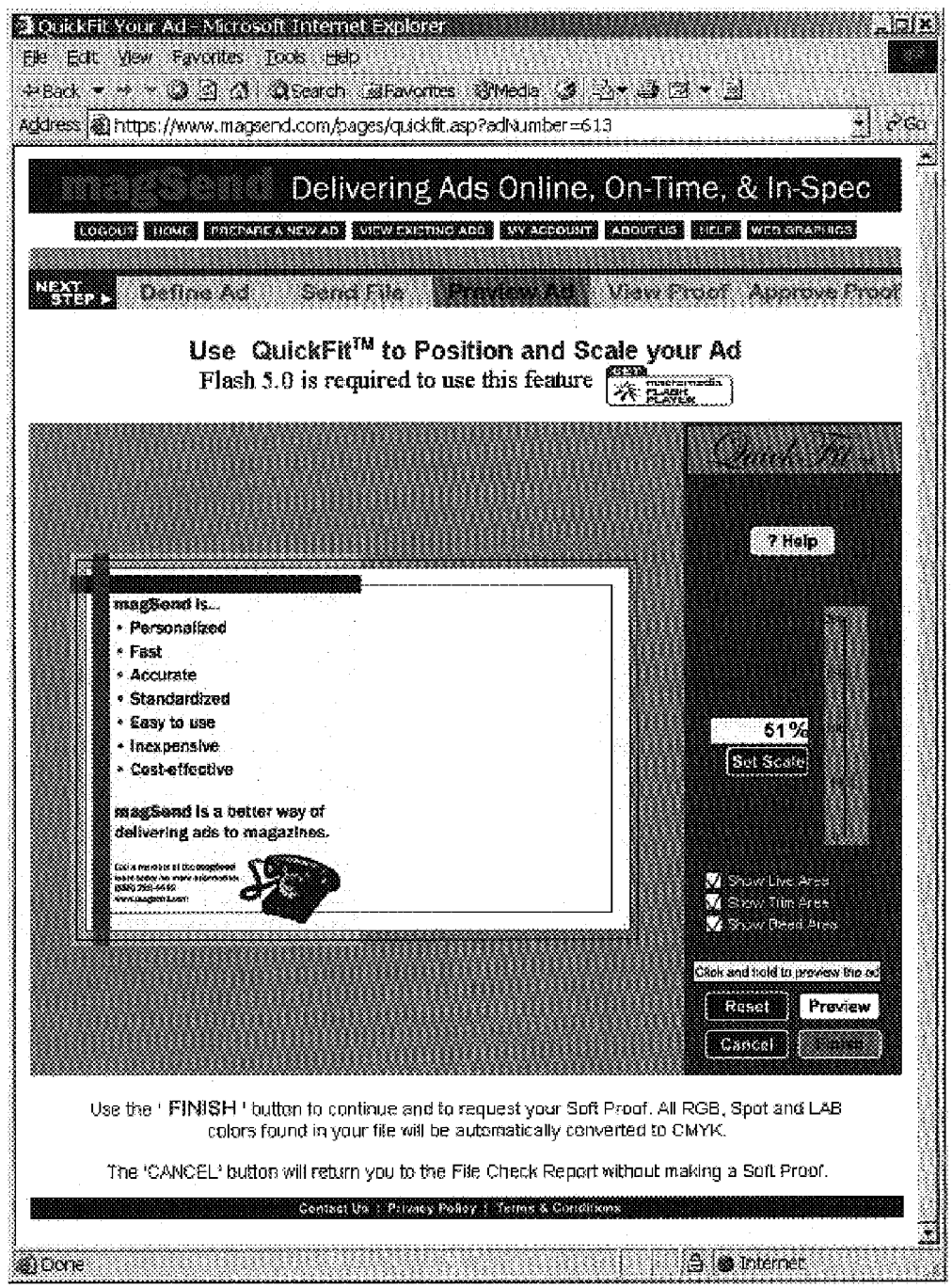

FIG. 11 shows an x-axis movement to the left and an additional scale reduction to 51%.

FIG. 12 shows the ability to preview the results. In the preview mode, the previously transparent ad borders become opaque to simulate the effect of "trimming" the ad. After manipulating the size and displacement (x-axis and/or y-axis) of the ad, it may become apparent that the original PDL ad file and/or the ad space must be modified. In this example, no matter how much the ad is manipulated, the ad cannot be made to look proper within the ad space. However, the user interface effectively communicates exactly how either the ad or the ad space can be modified so that no more than submission of a corrected file or selection of a different ad space size will be necessary. In a large number of instances, however, the process may be used to properly fit the ad to the ad space with no further submissions of a corrected file or selections of different ad space sizes.

As briefly discussed above, another feature of the present invention is that production specifications may be electroni- cally appended to the image display of the still image proxy (step 40). One type of production specification is a bindery specification, which may include operations such as perf, score, fold, collate, saddle stitch, emboss, deboss, and die- cut.

Once a user is satisfied with how the image display of the still image proxy appears with respect to the template, the user selects the "Finish" button. Any physical manipulations and/or production specifications that are made to the original image display of the still image proxy are recorded by the Flash Movie and sent, via the browser, to the web server that delivered the Flash Movie (step 50). The manipulations represent the net effect of changes made to each of the different types of manipulations. An example of physical manipulations made to an image in the embodiment shown in FIGS. 8-13 may be: 10 pixel movement in x axis; 20 pixel movement in y axis; 10% increase in scale. If other types of manipulations are allowed (e.g., contrast, stretching, fore- ground or background color changes), then these manipu- lations are also sent back to the web server. Pixel movements are translated into an actual dimension value, such as inches, based on the scale of the template and the actual size of the pixels.

FIG. 14 shows a display screen that appears as the information is being sent. Specifically, the x and y coordi- nates for the center of the still image proxy relative to the center of the ad space, and the scale percentage relative to the original size of the still image proxy are sent to the central server. These values are encoded using variables in a standard HTTP URL query string, as shown in the Address block.

The values that represent the physical image manipula- tions are used to modify the original predefined PDL image to match the physical modifications made to the still image proxy (step 60). More specifically, the web server passes data to a production server. The production server uses the physical manipulations and/or production specifications to modify the original PDL-defined image in a manner iden- tical to the modifications made to the still image proxy. This process is not a conversion of the still image proxy to a PDL image (here, a JPEG image to a Postscript file). Instead, it is the use of the recorded manipulations and appended pro- duction specifications to modify the original PDL image. This process, referred to herein as "Preflight Control: PDL Manipulations," performs scaling, cropping and floating of the PDL image. Details of this process are set forth in the Appendix. The functions of the web server and the produc- tion server may be performed by separate servers or by a single server.

FIG. 13 shows another Preview display screen. In this example, the user has revised the original PDL image file to better fit the purchased ad space, electronically resubmitted the ad, and completed the Quick Fit process on the revised ad. In this example, the ad was scaled to 135% of its original size and is shown relative to the ad space.

FIG. 15 shows a display screen of a preflight report for the revised ad. Manipulating the original PDL image can cause printability problems so a second preflight is performed and the report is displayed to the user. In the second preflight report, the final size of the PDL image file will always match the ad space dimensions.

The final step in the process is referred to herein as "Preflight Control: Final Manipulations." In this step, crop marks are removed if they are not needed in the electronic ad file (i.e., the revised PDL image file). Removing crop marks too early may prevent the preflight software from determining the exact page size. By waiting until after the user-driven manipulations are done and preflighted, additional manipulations performed at this point do not affect the preflight report that the user sees.

FIG. 16 shows a flowchart of some of the steps associated with one preferred embodiment of the preflight control PDL manipulations. The net effect of these steps is that the PDL file can be positioned relative to the job production specifications in its native format, thus best preserving overall image quality. Additional details of this process are set forth in the Appendix.

In one alternative embodiment of the present invention, the scale of the static template may also be changed via the user interface shown in FIGS. 8-13 so as to change the actual dimensions of the area in which the electronic document must fit. In the example wherein the static template is a purchased ad space, the permissible dimension changes must be pre-programmed in coordination with the publication that the ad will appear. In most instances, a publication has standard ad sizes, and thus the permissible dimension changes must fit one of the standard ad sizes. Thus, the selectable ad sizes should match the choices provided in the ad definition process shown in FIGS. 2A and 2B. In a tightly controlled sophisticated system, the permissible ad sizes may be further limited by the current availability of ad space in the publication.

Figure 17A:
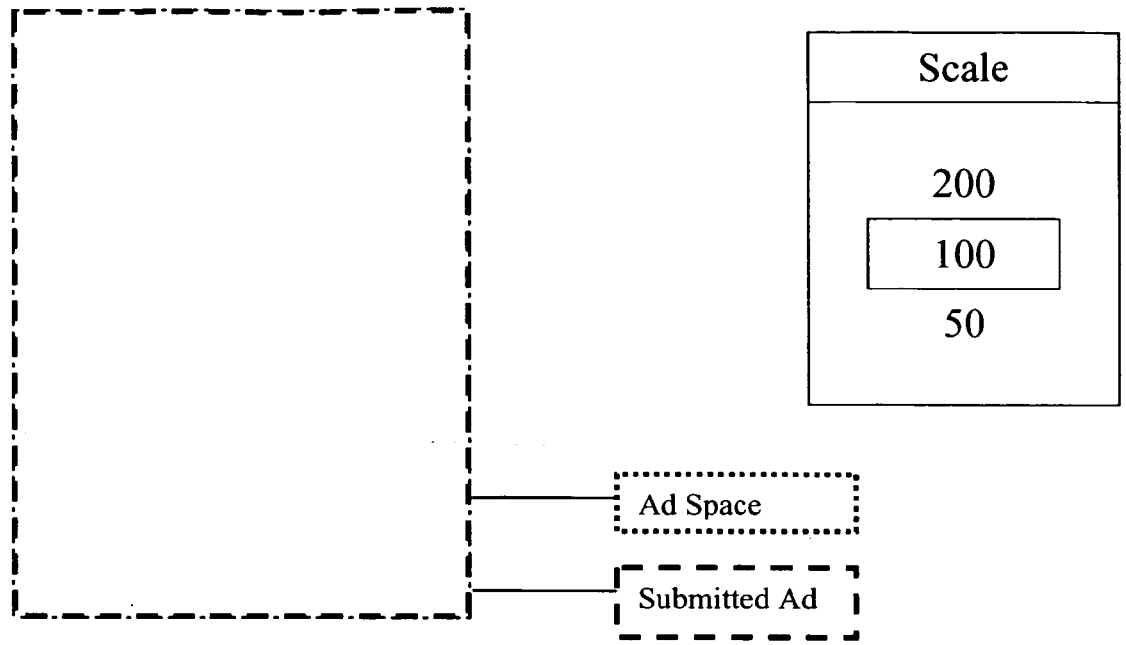
Figure 17B:
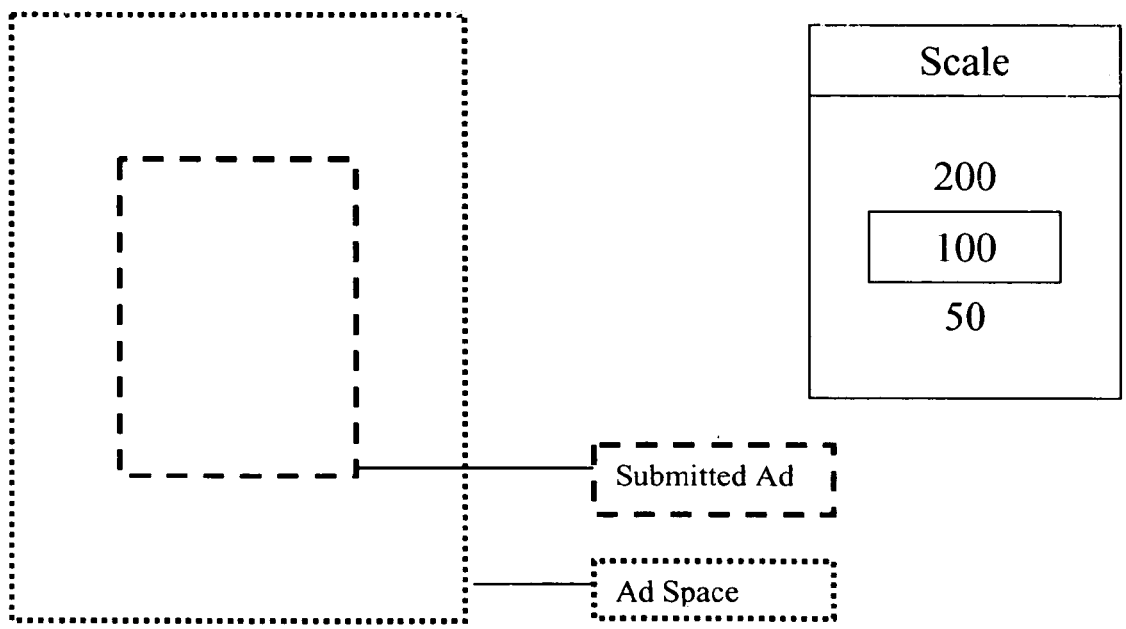
Figure 17C:
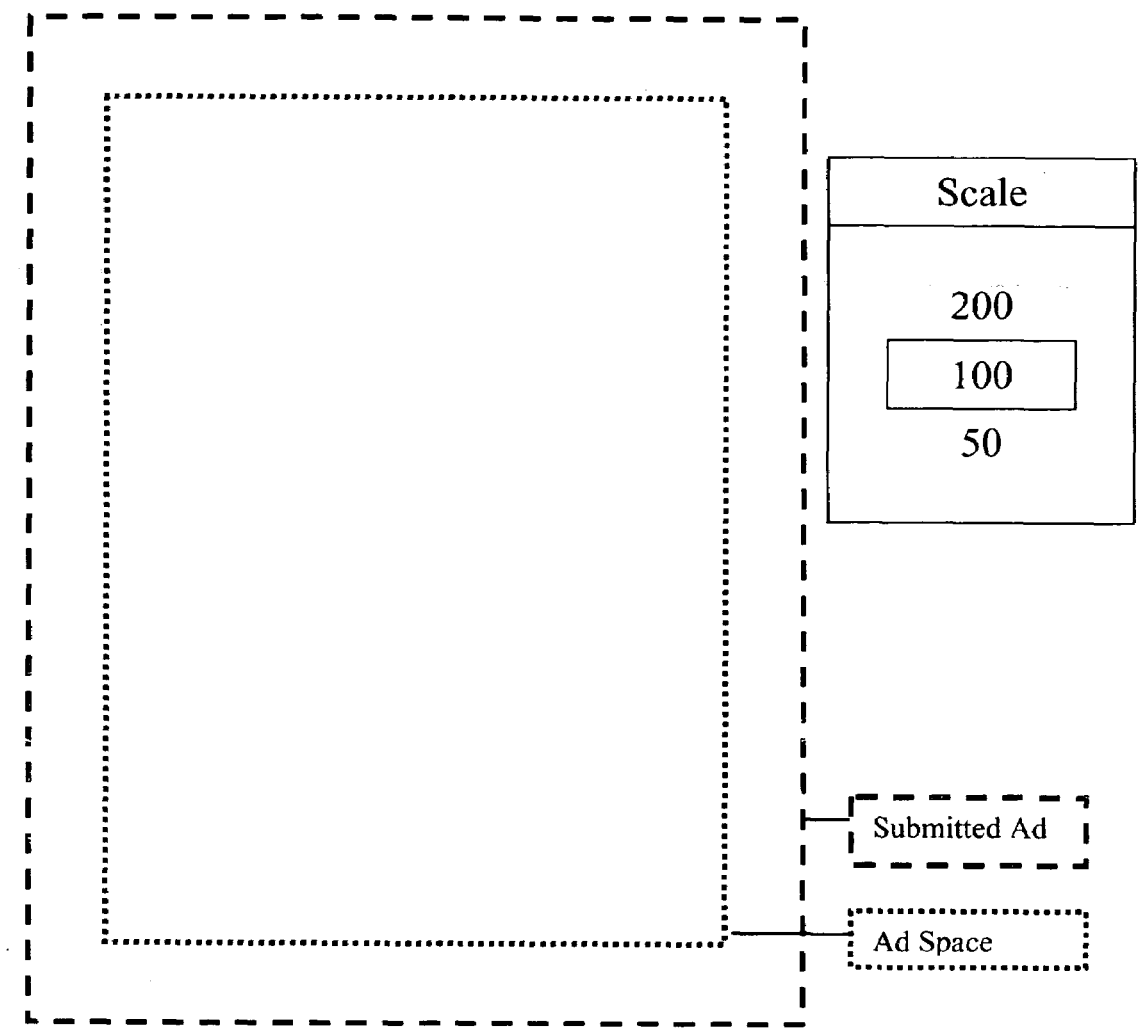
Figure 17D:
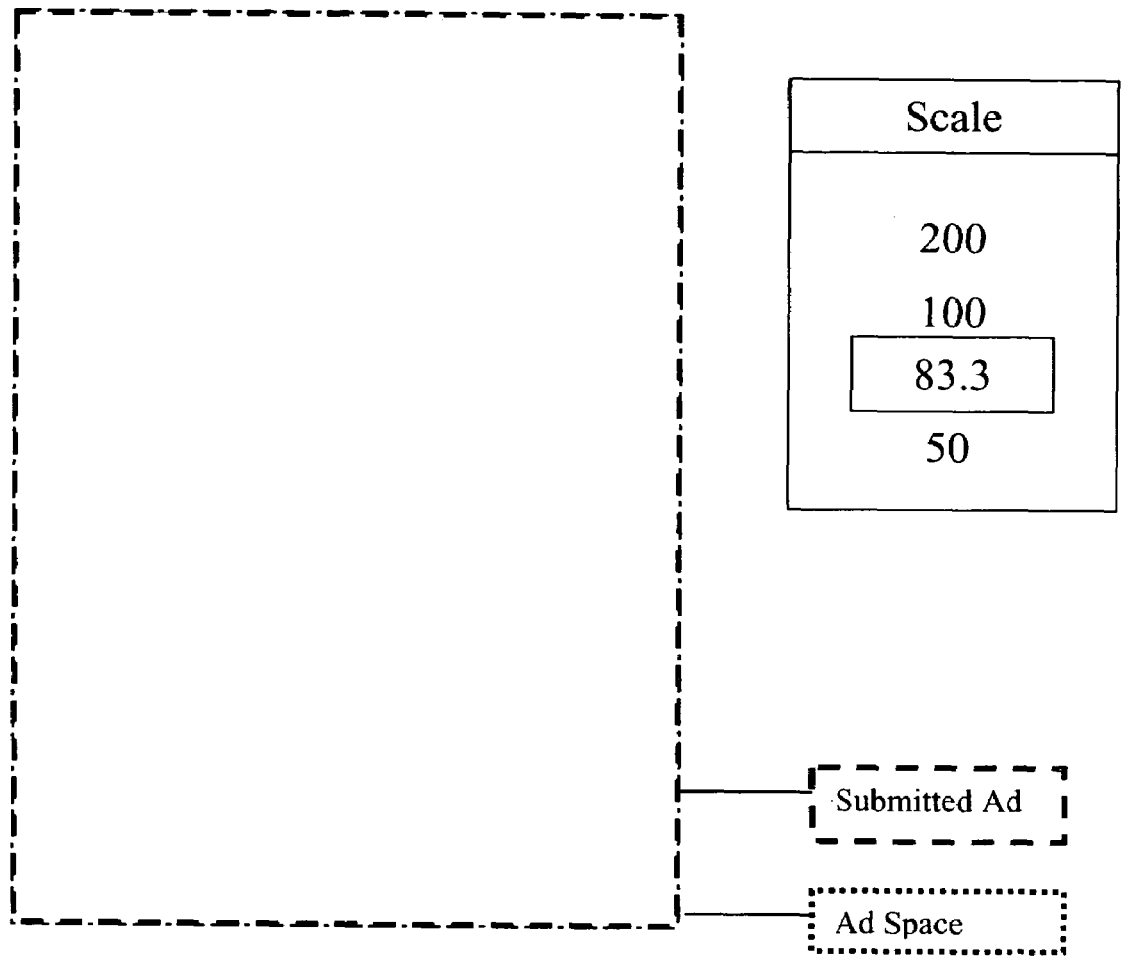

FIGS. 17A-17D further illustrate the dynamic sizing feature. FIG. 17A shows an example wherein the predetermined area in which the electronic document must fit (e.g., the purchased ad space) is 8 in×10 in, and the predefined physical dimensions of the PDL image file (e.g., the ad submitted by the customer) is also 8 in×10 in. In this example, the template and the still image proxy are the same size in the Flash Movie and the scale is automatically set to an initial value of 100%. FIG. 17B shows an example wherein the purchased ad space is still 8 in×10 in, but the ad submitted by the customer is 4 in×5 in. In this example, the template is the same size as the template in FIG. 17B, the scale is again 100%, but the ad is shown as being 50% of the size of the template. FIG. 17C shows an example wherein the purchased ad space is still 8 in×10 in, but the ad submitted by the customer is 9.6 in×12 in. In this example, the template is the same size as the template in FIG. 17B, the scale is again initially set to 100%, but the ad is shown as being 120% of the size of the template. Thus, the dimensions of the user's submitted ad changes in relation to the dimensions of the purchased ad space. In one preferred embodiment of the present invention, the still image proxy is initially scaled to a value that allows its larger dimension to exactly match the corresponding dimension of the template. This feature is shown in FIG. 17D. The template and ad are the same as in FIG. 17C, except that the scale is initially set to 83.3% so that the ad does not extend beyond the template border. To summarize the process, the template size is first set according to the purchased ad space, and then the ad is sized accordingly.

FIG. 18 shows one example of bindery data (bindery production specifications) being added to a still image proxy. In this example, the user added a three-hole punch, a full horizontal perf and a partial vertical perf. The location and type of bindery data is also communicated to the central server as part of the standard HTTP URL query string shown in FIG. 13 so that the actual production data can include appropriate instructions to add the bindery data to the print job.

FIG. 19 shows another example of production specifications that may be added to the still image proxy, other than bindery data. In this example, the dynamically generated, job parameter specific, static template is used for a two image process (two page layout). Two different still image proxies are shown, one for each page. The pages may be moved up and down relative to each other to ensure cross-page alignment. Any changes made from the initial display screen are communicated to the central server as part of the standard HTTP URL query string shown in FIG. 13.

The Appendix provides source code for one preferred embodiment of the present invention. The source code is provided for performing each of the steps set forth in FIGS. 7 and 16 for the one preferred embodiment. The source code is divided into sections that correspond to the following functions:

1. "Preflight Control: Preflight" loads the parameters for the preflight and launches the preflight software. After preflight the dimensions of the PDL are compared to the dimensions of the ad space and a further customized preflight report is generated.
2. "Set QuickFit Parameters" calculates parameters used to create the QuickFit instance.
3. "Create Preview Image" creates the web browser compatible (JPEG) version of the PDL.
4. "Generate Flash Movie" creates the instance of QuickFit by inserting the JPEG image into a Flash movie.
5. "Internals of Flash Movie" relates to the internal workings of the Flash Movie.
6. "QuickFitSaveCoords" contains server side code that captures coordinates from web browser manipulations and stores them on the server.
7. "Preflight Control: PDL Manipulations" is code that performs scaling, cropping and floating of the PDL file.
  "Preflight Control: Final Manipulations." The function of this code is described above.

FIG. 20 is a design view of QuickFit.fla and relates to section 5 of the source code (Internals of Flash Movie). QuickFit.fla is divided into layers to make it easier to manipulate the appearance of graphic elements. A listing of layers in QuickFit.fla is provided below:
Scene 1
  button
  invisible button
  slider button
  scale numbers
  arrow
  labels
  invisible scale
  slider
  border
  edit box work window
work area
adimage
ad background
background
loader
config FIG. 21 is a design view of a preflight control status window that relates to section 7 of the source code (Preflight Control: PDL Manipulations).

In alternative embodiments of the present invention, the still image proxy may be inserted into other types of browser-compatible programs that allow the user to manipulate the image display of the still image proxy without using Flash. Other programming techniques that can perform similar functions as the Flash Movie include Dynamic HTML (DHTML), Java® applets, Microsoft Windows Forms (part of Microsoft's .NET framework), and ActiveX® control.

The QuickFit process described above is initiated by the user in response to a recommendation in a preflight report. However, the process may be initiated any time that the customer wishes to view how their electronic document will appear in a predetermined area in which the electronic document must fit, even if no problems are highlighted in a preflight report. Furthermore, the process may be used solely to add or change production specifications to an electronic document.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An automated computer-implemented method of preparing production data for a print job, the production data including an electronic document defined by a page description language (PDL), the electronic document being stored in a PDL image file, the method comprising:
   (a) creating an image display of a still image proxy of the PDL image file;
   (b) electronically appending production specifications to the image display of the still image proxy and recording information about the appended production specifications; and
   (c) using the recorded information about the appended production specifications to prepare production data for the print job.

2. The method of claim 1 wherein the production specifications are physical manipulations of stock used in the print job, wherein step (b) comprises appending the physical manipulations of the stock to the image display of the still image proxy in the desired relation to the image display of the still image proxy, and recording information about the physical manipulations of the stock, and step (c) comprises using the recorded information about the physical manipulations of the stock to prepare production data for the print job.

3. The method of claim 2 wherein the physical manipulations are bindery specifications.

4. The method of claim 1 wherein step (b) is performed by a user interacting with the image display of the still image proxy.

5. An automated comnputer-implemented apparatus for preparing production data for a print job, the production data including an electronic document defined by a page description language (PDL), the electronic document being stored in a PDL image file, the apparatus comprising;
   (a) means for creating an image display of a still image proxy of the PDL image file;
   (b) means for electronically appending production specifications to the image display of the still image proxy and recording information about the appended production specifications; and
   (c) means for using the recorded information about the appended production specifications to prepare production data for the print job.

6. The apparatus of claim 5 wherein the production specifications are physical manipulations of stock used in the print job, wherein the means for electronically appending comprises appending the physical manipulations of the stock to the image display of the still image proxy in the desired relation to the image display of the still image proxy, and recording information about the physical manipulations of the stock, and the means for using the recorded information about the appended production specifications comprises using the recorded information about the physical manipulations of the stock to prepare production data for the print job.

7. The apparatus of claim 6 wherein the physical manipulations are bindery specifications.

8. The apparatus of claim 5 wherein the means for electronically appending production specifications to the image display of the still image proxy receives its production specifications from a user interacting with the image display of the still image proxy.

9. An article of manufacture for preparing production data for a print job, the production data including an electronic document defined by a page description language (PDL), the electronic document being stored in a PDL image file, the article of manufacture comprising a computer-readable medium encoded with computer-executable instructions for performing a method comprising:
   (a) creating an image display of a still image proxy of the PDL image file;
   (b) electronically appending production specifications to the image display of the still image proxy and recording information about the appended production specifications; and
   (c) using the recorded information about the appended production specifications to prepare production data for the print job.

10. The article of manufacture of claim 9 wherein the production specifications are physical manipulations of stock used in the print job, wherein step (b) comprises appending the physical manipulations of the stock to the image display of the still image proxy in the desired relation to the image display of the still image proxy, and recording information about the physical manipulations of the stock, and step (c) comprises using the recorded information about the physical manipulations of the stock to prepare production data for the print Job.

11. The article of manufacture of claim 10 wherein the physical manipulations are bindery specifications.

12. The article of manufacture of claim 9 wherein step (b) is performed by a user interacting with the image display of the still image proxy.

* * * * *